United States Patent
Ebata

(10) Patent No.: US 7,392,357 B2
(45) Date of Patent: Jun. 24, 2008

(54) SNAPSHOT FORMAT CONVERSION METHOD AND APPARATUS

(75) Inventor: Atsushi Ebata, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 350 days.

(21) Appl. No.: 11/361,366

(22) Filed: Feb. 24, 2006

(65) Prior Publication Data

US 2007/0156984 A1    Jul. 5, 2007

(30) Foreign Application Priority Data

Jan. 5, 2006    (JP) .............................. 2006-000901

(51) Int. Cl.
*G06F 12/00* (2006.01)

(52) U.S. Cl. .................... 711/162; 711/112; 711/114; 711/161; 707/202; 707/204

(58) Field of Classification Search ................. 711/162; 707/204
See application file for complete search history.

(56) References Cited

U.S. PATENT DOCUMENTS 6,101,497 A    8/2000 Ofek
7,237,076 B2 *    6/2007 Nakano et al. ............... 711/162
2004/0030727 A1*    2/2004 Armangau et al. .......... 707/200
2004/0186900 A1    9/2004 Nakano et al.
2005/0210193 A1    9/2005 Nagata
2007/0226730 A1*    9/2007 Coyle et al. .................. 717/170

FOREIGN PATENT DOCUMENTS

JP    2005-267569    3/2004

* cited by examiner

*Primary Examiner*—Donald Sparks
*Assistant Examiner*—Hashem Farrokh
(74) *Attorney, Agent, or Firm*—Reed Smith LLP; Stanley P. Fisher, Esq.; Juan Carlos A. Marquez, Esq.

(57) ABSTRACT

A system according to this invention converts a full-copy snapshot into a differential snapshot. The system is composed of a storage subsystem and a server subsystem. The storage subsystem comprises a disk drive and a disk controller. The server subsystem comprises an interface, a processor, and a memory. The disk controller provides storage areas of the disk drive as logical volumes, and stores a differential block bitmap. The processor obtains the differential block bitmap, and identifies a block from the differential block bitmap. The processor obtains, from a full-copy snapshot volume, differential data that is stored in the identified block. The processor stores the obtained differential data in a differential volume. The processor stores, in differential block arrangement information, the location of the differential data stored in the differential volume.

17 Claims, 15 Drawing Sheets

FIG. 5

| Block<br>VVOLNo. | 1 | 2 | ... | 122 | 123 | 124 | ... | n | PRIMARY VOLUME ID | DIFFERENTIAL VOLUME ID | USE FLAG |
|---|---|---|---|---|---|---|---|---|---|---|---|
| No.1 | 0 | 0 | ... | 0 | 0 | 0 | ... | 0 | 0006 | 0012 | 1 |
| No.2 | 0 | 0 | ... | 0 | 0 | 0 | ... | 0 | 0013 | 0014 | 1 |
| No.3 | 0 | 0 | ... | 0 | 456 | 0 | ... | 0 | 0001 | 0005 | 1 |
| ... | ... | ... | ... | ... | ... | ... | ... | ... | ... | ... | ... |
| No.m | 0 | 0 | ... | 0 | 0 | 0 | ... | 0 | ... | ... | ... |

VVOL(No.3)'s #2 block msps PVOL Block#2

VVOL(No.3)'s #123 block msps DVOL Block#456

DIFFERENTIAL BLOCK BITMAP

| SNAPSHOT CONVERSION PROCESS NUMBER 301 | CONVERSION DESTINATION VOLUME IDENTIFIER 302 | CONVERSION SOURCE VOLUME IDENTIFIER 303 | CONVERSION-UNDERGOING BLOCK ADDRESS 304 |
|---|---|---|---|
| 0 | 0001 | 0005 | 0225 |
| 1 | 0006 | 0012 | 1055 |
| 2 | NIL | NIL | NIL |
| 3 | 0013 | 0015 | 5862 |
| 4 | NIL | NIL | NIL |
| 5 | NIL | NIL | NIL |

217
SNAPSHOT FORMAT CONVERSION MANAGEMENT TABLE

218
DIFFERENTIAL BLOCK COPY BITMAP

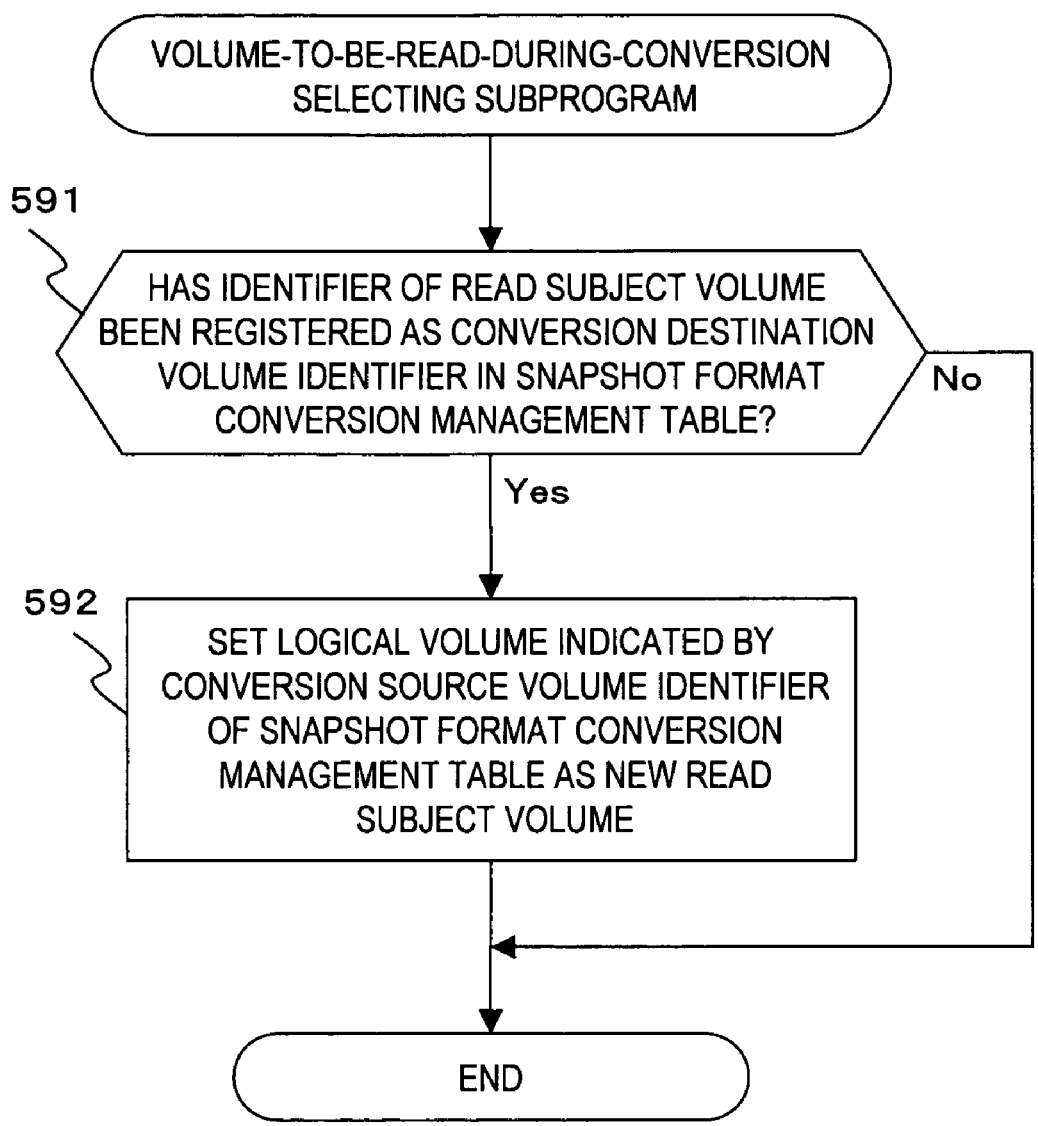

SNAPSHOT FORMAT CONVERSION METHOD AND APPARATUS

CLAIM OF PRIORITY

The present application claims priority from Japanese patent application P2006-000901 filed on Jan. 5, 2006, the content of which is hereby incorporated by reference into this application.

BACKGROUND

This invention relates to a system including a storage subsystem and a server subsystem, and more specifically to a snapshot management technique.

SAN-NAS integrated storage systems which high-performance SAN and easy-to-manage NAS are lately becoming popular.

SAN-NAS integrated storage systems have a snapshot function in order to protect data stored in a primary volume. Using the snapshot function, a SAN-NAS integrated storage system takes a snapshot which is a still image of a primary volume at a specific point in time. Known snapshot technologies include full-copy snapshot and differential snapshot.

U.S. Pat. No. 6,101,497 discloses a technique related to full-copy snapshot. A SAN-NAS integrated storage system creates a mirror volume synchronized with a primary volume. The SAN-NAS integrated storage system creates a full-copy snapshot by performing splitting processing in which the created mirror volume is split physically.

A drawback of full-copy snapshot is large consumption of disk resource, which means that fewer generations are provided. An advantage of full-copy snapshot is very high access performance owing to physical separation from primary volumes. Full-copy snapshot is therefore used as snapshot of which high access performance is demanded, for example, as snapshot for online backup.

US 2004/01896900 discloses a technique related to differential snapshot. A SAN-NAS integrated storage system stores only differential data which is the difference between a differential snapshot and a primary volume. The SAN-NAS integrated storage system combines the stored differential data with the primary volume, to thereby provide a virtual differential snapshot.

Created by combining differential data with a primary volume, differential snapshot does not have as high access performance as full-copy snapshot. On the other hand, differential snapshot uses a small amount of disk resource and therefore can provide more generations than full-copy snapshot. For instance, differential snapshot is employed as snapshot for regular backup of a shared file server.

The full-copy snapshot and differential snapshot functions enable SAN-NAS integrated storage systems to provide snapshots suited to access performance requirements and disk resource usage requirements.

JP 2005-267569 A discloses a storage system that utilizes a snapshot function in remote copy. This storage system copies differential data from a primary volume to a copy volume while referring to a bitmap.

SUMMARY

In general, access performance requirements for a snapshot are eased with time, while disk resource usage requirements for a snapshot become stricter with time.

When a full-copy snapshot is converted into a differential snapshot after a certain period of time passes, SAN-NAS integrated storage systems can fulfill access performance requirements and disk resource usage requirements for a snapshot. However, conventional storage systems are not capable of converting a full-copy snapshot into a differential snapshot.

This invention has been made in view of the problem described above, and it is therefore an object of this invention to provide an integrated storage system capable of converting a full-copy snapshot into a differential snapshot.

According to an exemplary embodiment of this invention, there is provided a system connected to a client computer via a network, including: a storage subsystem; and a server subsystem connected to the storage subsystem via a communication line, in which: the storage subsystem comprises a disk drive for storing data, and a disk controller for controlling input and output of data to and from the disk drive; the server subsystem comprises an interface connected to the storage subsystem, a processor connected to the interface, and a memory connected to the processor; the disk controller provides storages area of the disk drive as a plurality of logical volumes including a primary volume for storing data requested by the client computer to be written, a differential volume for storing differential data as a difference between the primary volume and a differential snapshot of the primary volume, and a full-copy snapshot volume for storing all data in the primary volume at the time a full-copy snapshot is taken; the disk controller stores a differential block bitmap indicating a block in which data stored in the primary volume differs from data stored in the full-copy snapshot volume; and the processor obtains the differential block bitmap from the disk controller, identifies, from the obtained differential block bitmap, a block where data stored in the primary volume differs from data stored in the full-copy snapshot volume, obtains, from the full-copy snapshot volume, differential data that is stored in the identified block, stores the obtained differential data in the differential volume, stores, in differential block arrangement information, a location of the differential data that is stored in the differential volume, and provides a differential snapshot that corresponds to the full-copy snapshot based on the primary volume, the differential volume, and the differential block arrangement information.

According to the exemplary embodiment of this invention, an integrated storage system can convert a full-copy snapshot into a differential snapshot.

BRIEF DESCRIPTION OF THE DRAWINGS

The present invention can be appreciated by the description which follows in conjunction with the following figures, wherein:

FIG. 5 is a configuration diagram of a differential block management table according to the embodiment of this invention;

FIG. 18 is a flow chart for processing of a volume-to-be-read-during-conversion selecting subprogram according to the embodiment of this invention.

DETAILED DESCRIPTION OF THE PREFERRED EMBODIMENT

An embodiment of this invention will be described below with reference to the accompanying drawings.

Figure 1:
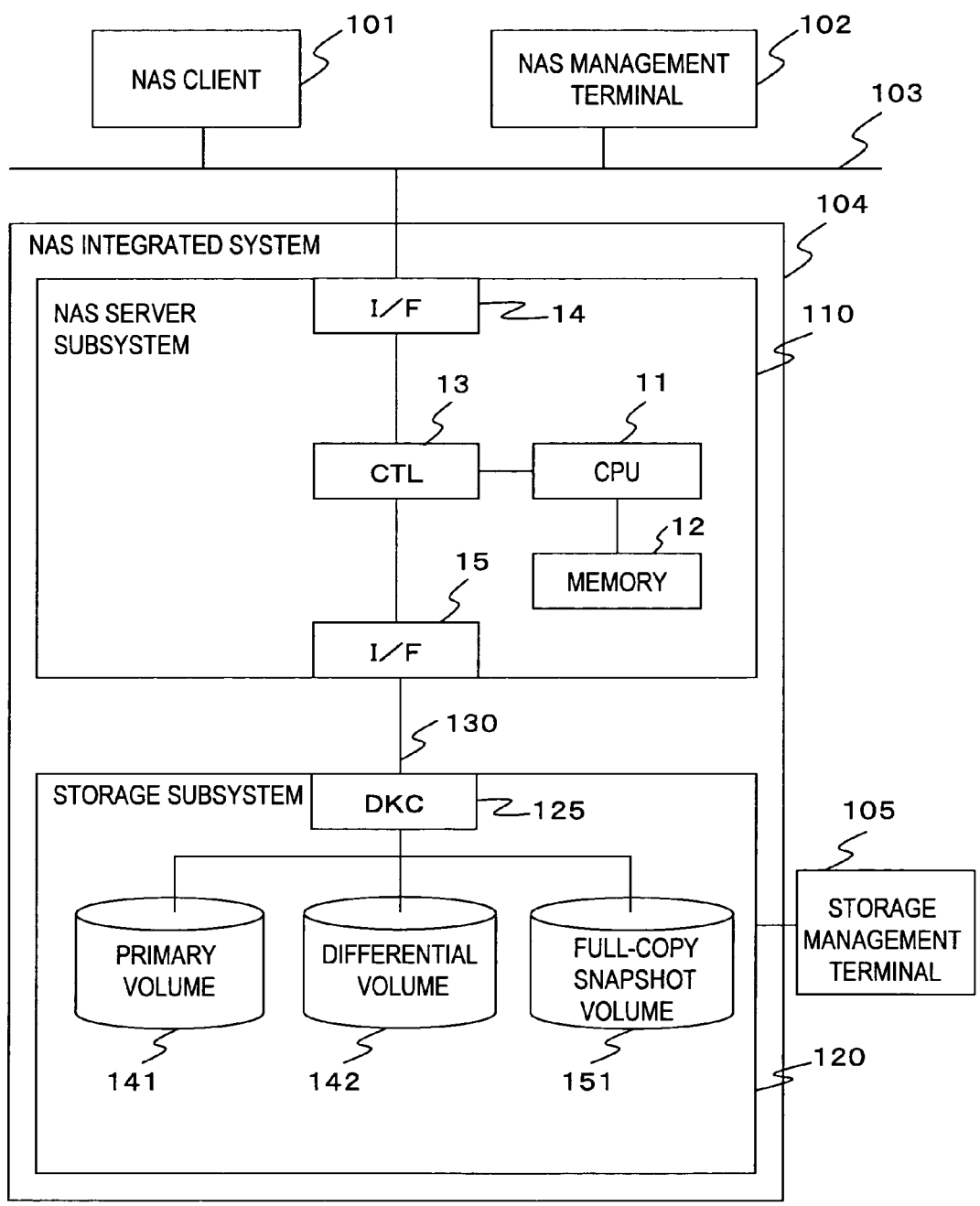
FIG. 1 is a block diagram showing the configuration of an information system according to an embodiment of this invention.

FIG. 1 is a block diagram showing the configuration of an information system according to the embodiment of this invention.

The information system comprises a NAS client 101, a NAS management terminal 102, a NAS integrated system 104, and a storage management terminal 105.

The NAS integrated system 104 is connected to the NAS client 101 and the NAS management terminal 102 via a network 103. The network 103 is, for example, a LAN, the Internet, or a WAN.

The NAS integrated system 104 comprises a NAS server subsystem 110 and a storage subsystem 120. The NAS integrated system 104 provides NAS services to the NAS client 101.

The NAS services include a file sharing service, a snapshot service, and a snapshot format conversion service. The file sharing service and the snapshot service, which are of known technologies, will not be described in detail. The snapshot format conversion service is a service that is implemented for the first time by this embodiment.

The NAS server subsystem 110 and the storage subsystem 120 are connected to each other by an internal network 130. The internal network 130 may be a dedicated bus incorporated in the NAS integrated system 104, or may be a general-purpose network such as a SAN or a LAN.

The NAS server subsystem 110 may be connected to a plurality of storage subsystems 120 via the internal network 130. The storage system 120 may be connected to a plurality of NAS server subsystems 110 via the internal network 130.

The NAS server subsystem 110 has a CPU 11, a memory 12, a data transfer controller 13, a network interface 14, and a storage interface 15.

The CPU 11 performs various types of processing by executing programs stored in the memory 12. The memory 12 stores programs executed by the CPU 11 and information. Details of the programs and information stored in the memory 12 will be described with reference to FIG. 2. The memory 12 may contain a data cache (not shown).

The data transfer controller 13 transfers data among the CPU 11, the network interface 14, and the storage interface 15. The data transfer controller 13, instead of the memory 12, may be provided with a data cache.

The network interface 14 is an interface connected to the network 103. The storage interface 15 is an interface connected to the storage subsystem 120 via the internal network 130.

The storage subsystem 120 has a disk controller (DKC) 125 and a plurality of disk drives.

The disk controller 125 has a CPU, a memory, and an interface to read and write data in the disk drives. The disk controller 125 provides storage areas of the disk drives to the NAS client 101 on a logical volume basis.

Each logical volume is set as a primary volume 141, a differential volume 142, or a full-copy snapshot volume 151. The storage subsystem 120, which, in FIG. 1, has one primary volume 141, one differential volume 142, and one full-copy snapshot volume 151, may have more than one volume for each of the three different volume types.

The primary volume 141 stores data that is requested by the NAS client 101 to be written.

The differential volume 142 stores differential data which is the difference between a differential snapshot managed by the NAS server subsystem 110 and the primary volume 141. The differential volume 142 contains a differential block management table 203.

The full-copy snapshot volume 151 is a copy of the primary volume 141 at some point in time. The disk controller 125 creates the full-copy snapshot volume 151 by executing a mirror management program, which will be described later with reference to FIG. 7.

The NAS management terminal 102 is a computer having a CPU, a memory, and an interface. The NAS management terminal 102 gives instructions to the NAS integrated system 104 to control the NAS integrated system 104.

The storage management terminal 105 is a computer having a CPU, a memory, and an interface. The storage management terminal 105 controls the storage subsystem 120.

Figure 2:
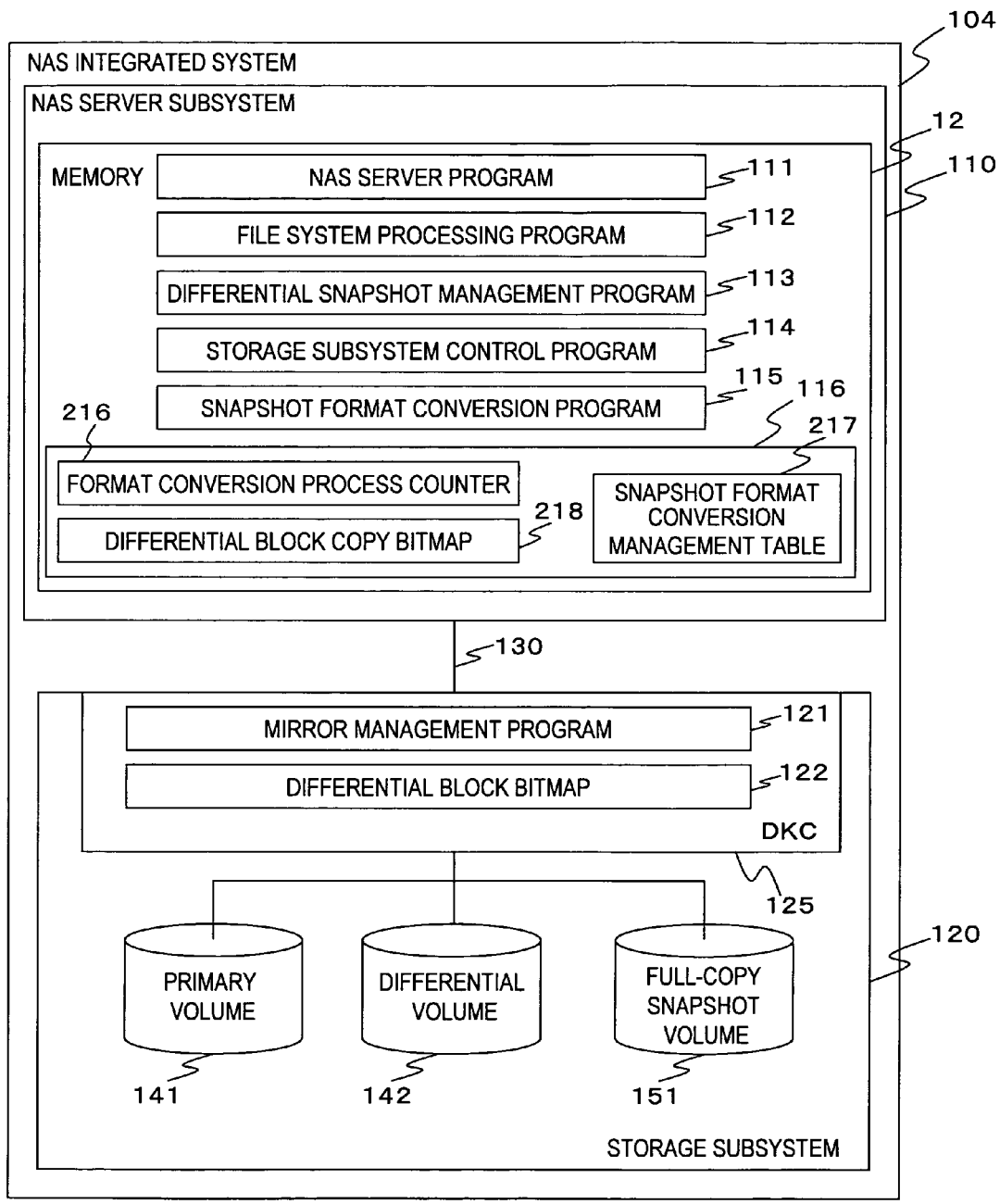
FIG. 2 is a block diagram about functions of a NAS integrated system according to the embodiment of this invention.

FIG. 2 is a block diagram about functions of the NAS integrated system 104 according to the embodiment of this invention.

The NAS integrated system 104 has the NAS server subsystem 110 and the storage subsystem 120.

The memory 12 of the NAS server subsystem 110 stores a NAS server program 111, a file system processing program 112, a differential snapshot management program 113, a storage subsystem control program 114, a snapshot format conversion program 115, and snapshot format conversion management information 116. Alternatively, the NAS server program 111, the file system processing program 112, the differential snapshot management program 113, the storage subsystem control program 114, the snapshot format conversion program 115, and the snapshot format conversion management information 116 may be stored in the memory of the disk controller 125 to be executed by the CPU of the disk controller 125.

The NAS server program 111 receives, from the NAS client 101, a request to access a file. The NAS server program 111 sends the received access request to the file system processing program 112. Then the NAS server program 111 receives a result of processing the access request from the file system processing program 112. The NAS server program 111 sends the received processing result to the NAS client 101, which is the sender of the access request.

The file system processing program 112 creates a read request or a write request in accordance with an access request that is received from the NAS server program 111. A read request created by the file system processing program 112 contains the identifier of a volume storing a file or a directory from which requested data is read, the address of a block from which the requested data is read (data block), the size of the data to be read, and the like. Similarly, a write request created by the file system processing program 112 contains the identifier of a volume storing a file or a directory in which requested data is written, the address of a block in which the requested data is written (data block), the size of the data to be written, and the like.

The file system processing program 112 sends the created read request or a write request to the differential snapshot management program 113.

The differential snapshot management program 113 manages a differential snapshot virtual volume, which will be described in detail with reference to FIG. 3.

The differential snapshot management program 113 receives a read request or a write request from the file system processing program 112. The differential snapshot management program 113 performs processing corresponding to the received read request or write request. Details of the differential snapshot management program 113 will be described with reference to FIG. 4.

The storage subsystem control program 114 controls a mirror management program 121 of the storage subsystem 120. Specifically, the storage subsystem control program 114 issues a mirroring request or a splitting request to the mirror management program 121 of the storage subsystem 120. This makes the NAS server subsystem 110 and the storage subsystem 120 operate in conjunction with each other, thus enabling the subsystems to work as one integrated NAS system 104.

The snapshot format conversion program 115 performs full-copy snapshot format conversion processing and differential snapshot format conversion processing. Details of the snapshot format conversion program 115 will be described with reference to FIG. 9.

The full-copy snapshot format conversion processing is processing to convert a full-copy snapshot into a differential snapshot. The differential snapshot format conversion processing is processing to convert a differential snapshot into a full-copy snapshot.

Full-copy snapshot, which, in this embodiment, is managed by the storage subsystem 120, may be managed by the NAS server subsystem 110. Differential snapshot, which, in this embodiment, is managed by the NAS server subsystem 110, may be managed by the storage subsystem 120.

The snapshot format conversion management information 116 is used by the snapshot format conversion program 115. The snapshot format conversion management information 116 contains a format conversion process counter 216, a snapshot format conversion management table 217, and a differential block copy bitmap 218.

The format conversion process counter 216 indicates, as will be described later with reference to FIG. 10, the count of format conversion processing currently being executed by the snapshot format conversion program 115. Format conversion processing executed by the snapshot format conversion program 115 is full-copy snapshot format conversion processing or differential snapshot format conversion processing.

The snapshot format conversion management table 217 is used, as will be described later with reference to FIG. 11, to manage format conversion processing currently being executed by the snapshot format conversion program 115. The differential block copy bitmap 218 is, as will be described later with reference to FIG. 12, a copy of a differential block bitmap 122 of the storage subsystem 120.

The memory of the disk controller 125 in the storage subsystem 120 stores the mirror management program 121 and the differential block bitmap 122. Alternatively, the mirror management program 121 and the differential block bitmap 122 may be stored in the memory 12 of the NAS server subsystem 110 to be executed by the CPU 11 of the NAS server subsystem 110.

The mirror management program 121 creates the full-copy snapshot volume 151. Specifically, the mirror management program 121 creates a mirror volume that is synchronized with the primary volume 141. The mirror management program 121 then performs splitting processing in which the created mirror volume is split physically, thereby creating the full-copy snapshot volume 151.

The differential block bitmap 122 indicates, as will be described later with reference to FIG. 8, the address of a block where data stored in the primary volume 141 differs from data stored in the full-copy snapshot volume 151.

Figure 3:
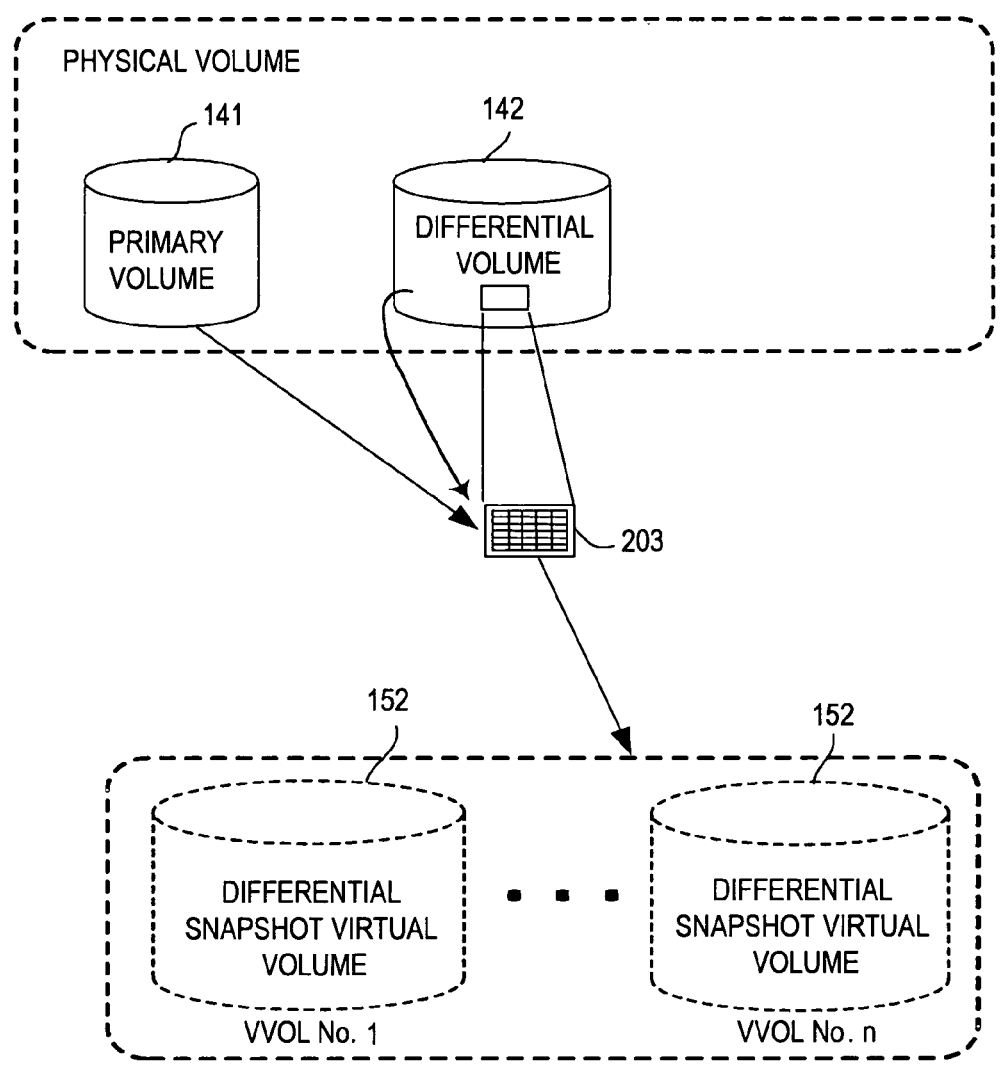
FIG. 3 is an explanatory diagram of a differential snapshot virtual volume, which is managed by a NAS server subsystem according to the embodiment of this invention.

FIG. 3 is an explanatory diagram of the differential snapshot virtual volume 152, which is managed by the NAS server subsystem 110 according to the embodiment of this invention.

The differential snapshot management program 113 of the NAS server subsystem 110 manages the differential volume 142 along with the primary volume 141. The primary volume 141 stores a file system that is in operation. The differential volume 142 stores differential data necessary for differential snapshot.

The differential snapshot management program 113 regularly creates the differential snapshot virtual volume 152 by updating the differential block management table 203, which is stored in the differential volume 142. For instance, the differential snapshot management program 113 creates the differential snapshot virtual volume 152 once a week. The differential snapshot virtual volume 152 is a virtual volume, and a copy of the primary volume 141 at some point in the past.

The differential block management table 203 is used, as will be described later with reference to FIG. 5, to manage data arrangement in the differential snapshot virtual volume 152.

The differential snapshot management program 113 combines data in the primary volume 141 and data in the differential volume 142 while referring to the differential block management table 203. Specifically, the differential snapshot management program 113 reads, out of the primary volume 141 and the differential volume 142, data in a block that is specified by the differential block management table 203. The differential snapshot management program 113 thus reads data of the differential snapshot virtual volume 152.

Figure 4:
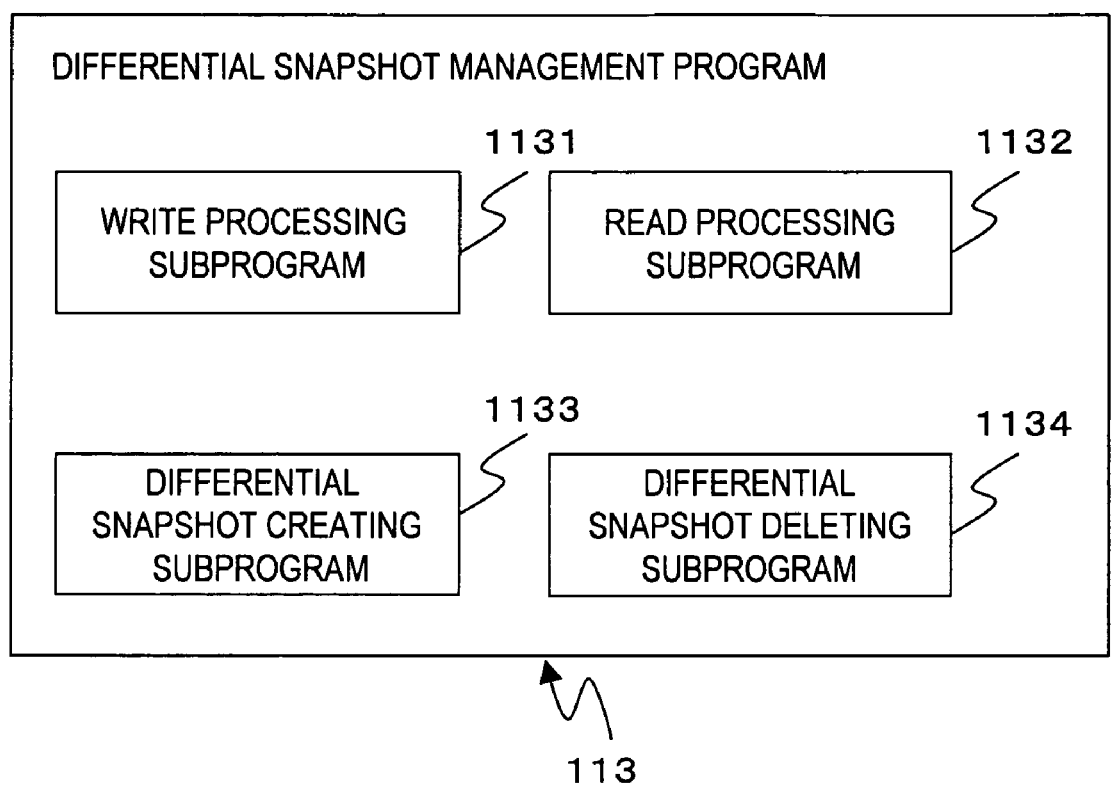
FIG. 4 is a block diagram of a differential snapshot management program in the NAS server subsystem according to the embodiment of this invention.

FIG. 4 is a block diagram of the differential snapshot management program 113 in the NAS server subsystem 110 according to the embodiment of this invention.

The differential snapshot management program 113 contains a write processing subprogram 1131, a read processing subprogram 1132, a differential snapshot creating subprogram 1133, and a differential snapshot deleting subprogram 1134.

The write processing subprogram 1131 receives a write request from the file system processing program 112. Upon reception of the request, the write processing subprogram 1131 evacuates data in the primary volume 141 of the storage subsystem 120 to the differential volume 142 of the storage subsystem 120. Then the write processing subprogram 1131 writes data requested to be written in the primary volume 141 of the storage subsystem 120. Details of processing performed by the write processing subprogram 1131 will be described with reference to FIG. 6.

The read processing subprogram 1132 receives a read request from the file system processing program 112. Upon reception of the request, the read processing subprogram 1132 reads data out of a logical volume of the storage subsystem 120. Details of processing performed by the read processing subprogram 1132 will be described with reference to FIG. 17.

The differential snapshot creating subprogram 1133 receives a differential snapshot creating request from the NAS management terminal 102. Upon reception of the request, the differential snapshot creating subprogram 1133 updates the differential block management table 203 stored in the differential volume 142. The differential snapshot creating subprogram 1133 thus creates the differential snapshot virtual volume 152.

The differential snapshot deleting subprogram 1134 receives a differential snapshot deleting request from the NAS management terminal 102. Upon reception of the request, the differential snapshot deleting subprogram 1134 updates the differential block management table 203 stored in the differential volume 142. The differential snapshot deleting subprogram 1134 thus deletes the differential snapshot virtual volume 152.

FIG. 5 is a configuration diagram of the differential block management table 203 according to the embodiment of this invention.

The differential block management table 203 stores a data state 2033 of a block in the differential snapshot virtual volume 152. Specifically, the differential block management table 203 stores the data state 2033 of a block that is associated with a VVOL number 2031 and a block address 2032.

The VVOL number 2031 indicates a snapshot generation identifier of the differential snapshot virtual volume 152. The block address 2032 indicates a unique identifier given to each block in the differential snapshot virtual volume 152.

The data state 2033 indicates a location where data of a block in the differential snapshot virtual volume 152 that is specified by the block address 2032 is actually located. Specifically, in the case where data of a block in the differential snapshot virtual volume 152 is stored in the primary volume 141, "0" is stored as the data state 2033. On the other hand, in the case where data of a block in the differential snapshot virtual volume 152 is stored in a block of the differential volume 142, the address of this block is stored as the data state 2033.

The differential block management table 203 also contains a primary volume ID 2035, a differential volume ID 2036, and a use flag 2037.

The primary volume ID 2035 indicates the identifier of the primary volume 141 where data of the differential snapshot virtual volume 152 that is specified by the VVOL number 2031 is actually stored. The differential volume ID 2036 indicates the identifier of the differential volume 142 where data of the differential snapshot virtual volume 152 that is specified by the VVOL number 2031 is actually stored.

The use flag 2037 indicates whether information stored in a record entry in question is valid or not. In other words, the use flag 2037 indicates whether the differential snapshot virtual volume 152 about which the record entry in question is made is valid or not.

Figure 6:
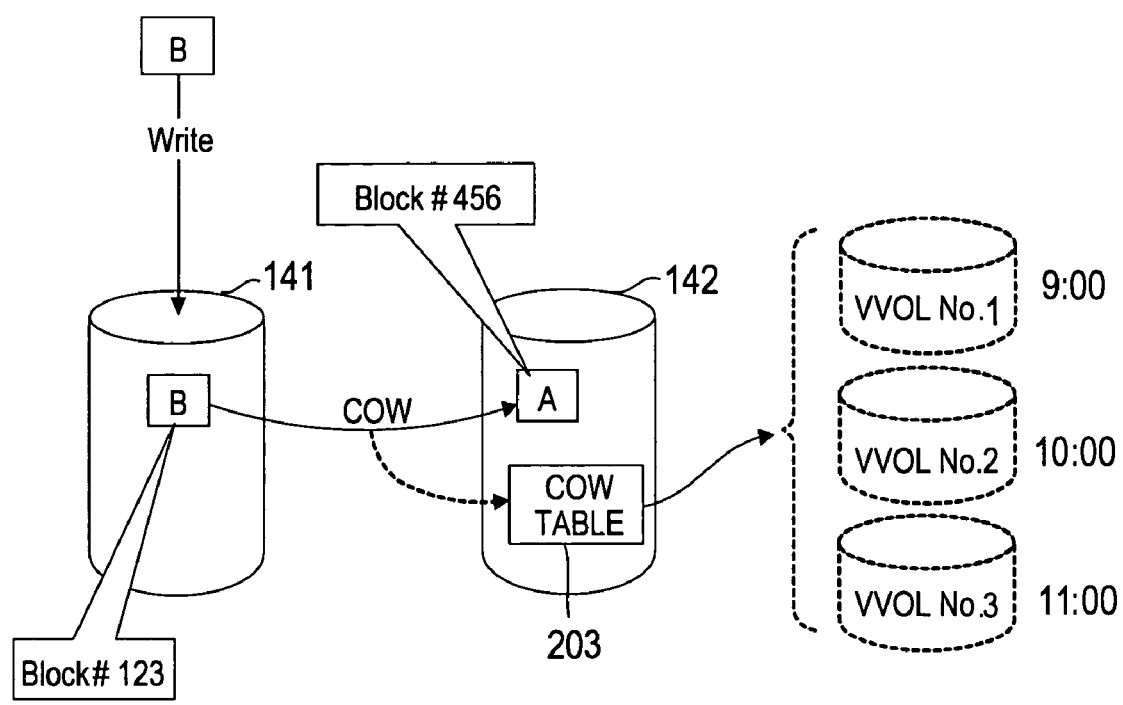
FIG. 6 is an explanatory diagram of processing of the differential snapshot management program according to the embodiment of this invention.

FIG. 6 is an explanatory diagram of processing of the differential snapshot management program 113 according to the embodiment of this invention.

The write processing subprogram 1131 of the differential snapshot management program 113 receives a write request from the file system processing program 112. Upon reception of the request, the write processing subprogram 1131 evacuates existing data of a block in which requested data is to be written from the primary volume 141 to the differential volume 142 through copy-on-write processing. Then the write processing subprogram 1131 writes the data requested to be written in the primary volume 141.

The differential snapshot management program 113 registers, in the differential block management table 203, the address of a block that stores the data evacuated to the differential volume 142. The differential snapshot management program 113 thus manages a differential snapshot as the differential snapshot virtual volume 152.

The description given below is about a case in which the write processing subprogram 1131 is requested to write data B in a block "#123" of the primary volume 141.

Upon reception of the request, the write processing subprogram 1131 allocates an evacuation block "#456" in the differential volume 142 in order to evacuate data A stored in the block "#123" of the primary volume 141. The write processing subprogram 1131 next writes the data A stored in the block "#123" of the primary volume 141 in the block "#456" of the differential volume 142. In this way, the write processing subprogram 1131 evacuates the data A stored in the block "#123" of the primary volume 141.

The write processing subprogram 1131 next writes the data B, which is data requested to be written, in the block "#123" of the primary volume 141. The write processing subprogram 1131 stores the address of the block "#456" of the differential volume 142 as the data state 2033 in the differential block management table 203.

To give an example, a case in which the current snapshot generation of the differential snapshot virtual volume 152 is "No. 3" will be described.

In this case, the write processing subprogram 1131 chooses a record entry of the differential block management table 203 that has, as the VVOL number 2031, "No. 3", which is the current snapshot generation of the differential snapshot virtual volume 152. The write processing subprogram 1131 next picks up, from the chosen entry, the data state 2033 where the address of the block "#123" of the primary volume 141 in which the data B is written matches the block address 2032 of the differential block management table 203. Then the write processing subprogram 1131 enters, as the picked up data state 2033, the address of the block "#456" in the differential volume 142 to which the data A is evacuated.

Described next is processing performed by the read processing subprogram 1132 of the differential snapshot management program 113 to read the differential snapshot virtual volume 152 whose snapshot generation is "No. 3".

The read processing subprogram 1132 consults the differential block management table 203 and reads data out of the primary volume 141 and the differential volume 142, to thereby read the differential snapshot virtual volume 152.

Specifically, the read processing subprogram 1132 reads data of blocks "#1 to #122" and "#124 to #n" in the differential snapshot virtual volume 152 out of the primary volume 141. The read processing subprogram 1132 also reads data of the block "#123" of the differential snapshot virtual volume 152 out of the block "#456" of the differential volume 142.

Figure 7:
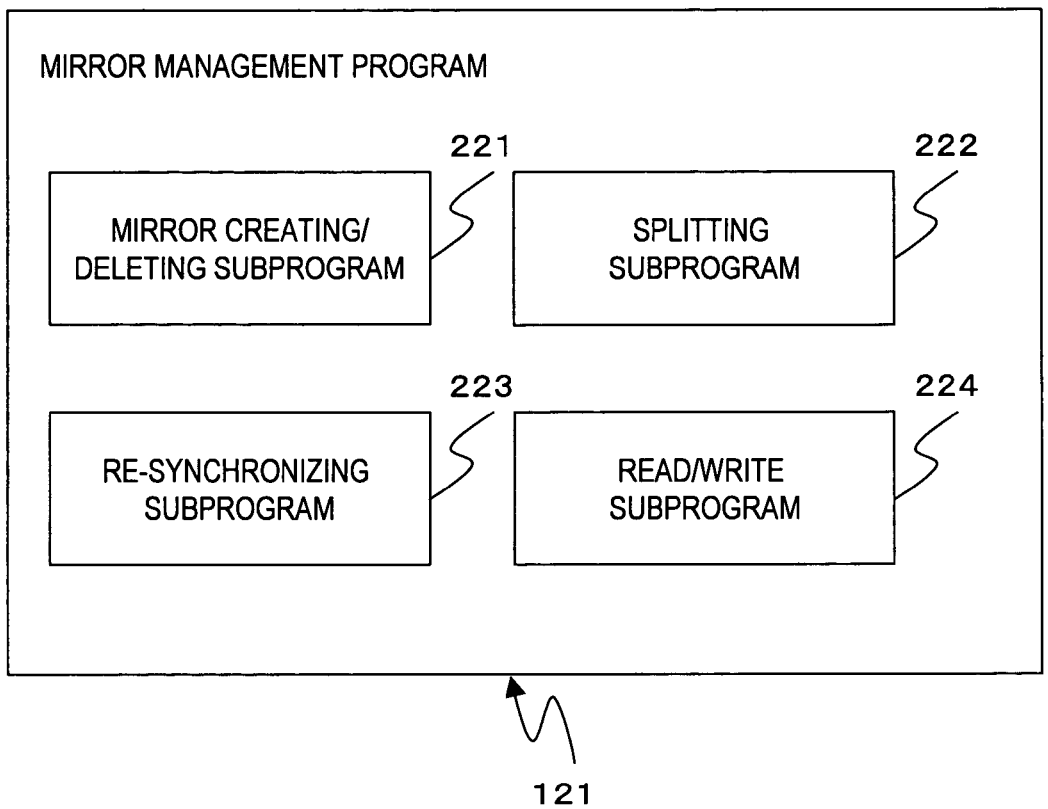
FIG. 7 is a block diagram of a mirror management program in a storage subsystem according to the embodiment of this invention.

FIG. 7 is a block diagram of the mirror management program 121 in the storage subsystem 120 according to the embodiment of this invention.

The mirror management program 121 is composed of a mirror creating/deleting subprogram 221, a splitting subprogram 222, a re-synchronizing subprogram 223, and a read/write subprogram 224.

The mirror creating/deleting subprogram 221 creates and deletes a mirror volume, which is a mirror of the primary volume 141. The splitting program 222 creates the full-copy snapshot volume 151 by physically cutting a mirror volume that is created by the mirror creating/deleting subprogram 221.

The re-synchronizing subprogram 223 makes data of the full-copy snapshot volume 151 reflected on the primary volume 141. The re-synchronizing subprogram 223 thus returns data in the primary volume 141 to what has been stored at the time the full-copy snapshot volume 151 in question is created.

The read/write subprogram 224 reads and writes data in the primary volume 141, the full-copy snapshot volume 151, and a mirror volume.

Figure 8:
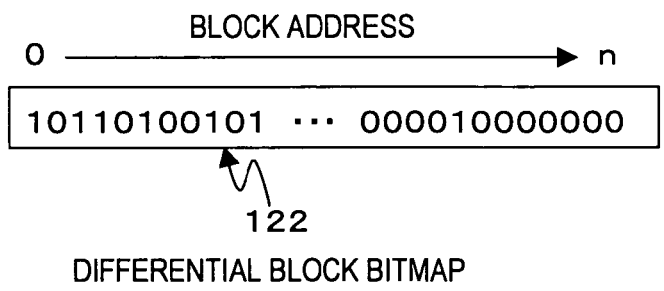
FIG. 8 is an explanatory diagram of a differential block bitmap of the storage subsystem according to the embodiment of this invention.

FIG. 8 is an explanatory diagram of the differential block bitmap 122 of the storage subsystem 120 according to the embodiment of this invention.

The differential block bitmap 122 indicates the address of a block where data stored in the primary volume 141 differs from data stored in the full-copy snapshot volume 151. Accordingly, the differential block bitmap 122 has a bit width equal to or larger than the count of blocks constituting the primary volume 141.

In the differential block bitmap 122 of this embodiment, "1" is given as the bit value of a block where data stored in the primary volume 141 differs from data stored in the full-copy snapshot volume 151, while "0" is given as the bit value of a block where the primary volume 141 and the differential volume 142 store the same data.

The differential block bitmap 122 is created, updated, or deleted by the mirror creating/deleting subprogram 221.

The differential block bitmap 122 is consulted by the re-synchronizing subprogram 223. The re-synchronizing subprogram 223 consults the differential block bitmap 122 to choose from the full-copy snapshot volume 151 only a block that stores data different from one in the primary volume 141. The re-synchronizing subprogram 223 performs re-synchronizing processing by writing data of the chosen block in the primary volume 141.

Figure 9:
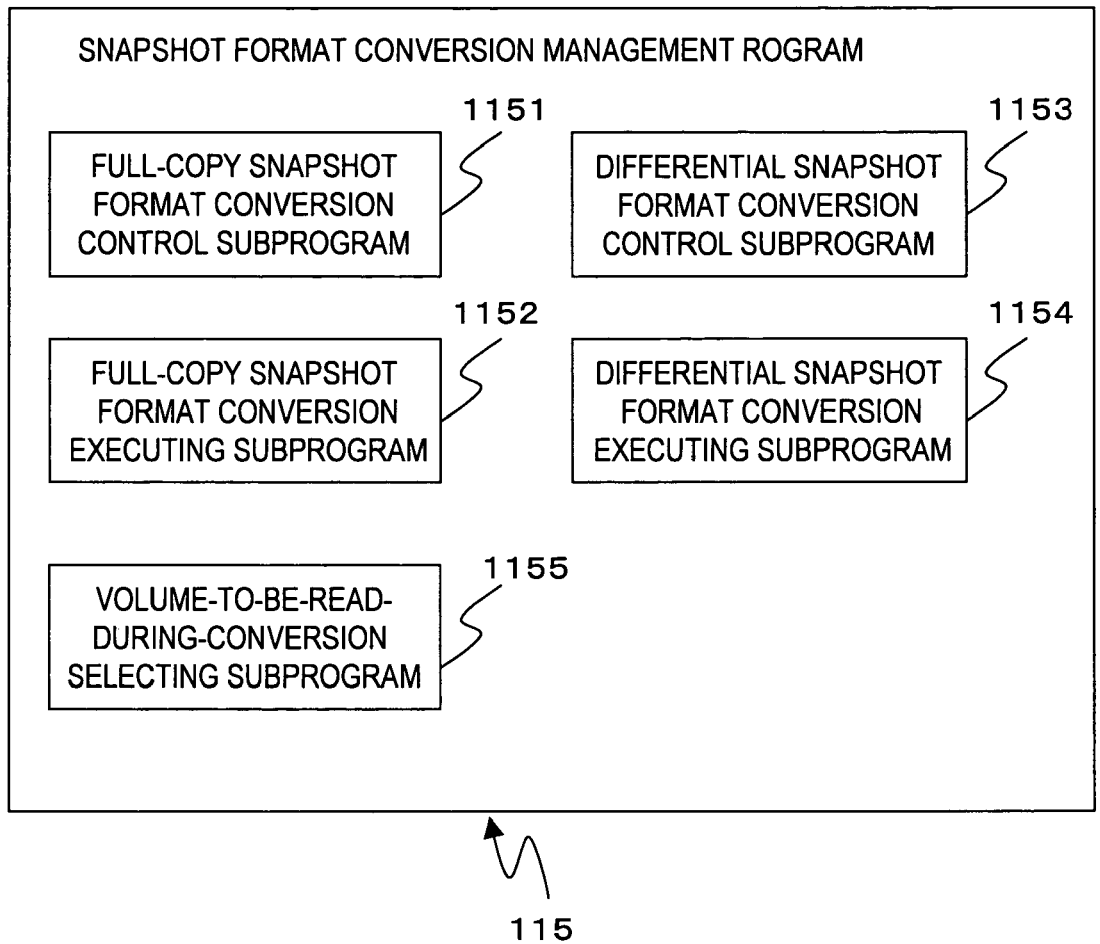
FIG. 9 is a block diagram of a snapshot format conversion program in the NAS server subsystem according to the embodiment of this invention.

FIG. 9 is a block diagram of the snapshot format conversion program 115 in the NAS server subsystem 110 according to the embodiment of this invention.

The snapshot format conversion program 115 contains a full-copy snapshot format conversion control subprogram 1151, a full-copy snapshot format conversion executing subprogram 1152, a differential snapshot format conversion control subprogram 1153, a differential snapshot format conversion executing subprogram 1154, and a volume-to-be-read-during-conversion selecting subprogram 1155.

The full-copy snapshot format conversion control subprogram 1151 receives a request from the NAS management terminal 102 to execute full-copy snapshot format conversion processing. Upon reception of the request, the full-copy snapshot format conversion control subprogram 1151 activates the full-copy snapshot format conversion executing subprogram 1152. The full-copy snapshot format conversion processing is processing to convert a full-copy snapshot into a differential snapshot. Details of processing performed by the full-copy snapshot format conversion control subprogram 1151 will be described with reference to FIG. 13.

The full-copy snapshot format conversion executing subprogram 1152 executes the full-copy snapshot format conversion processing. Details of processing performed by the full-copy snapshot format conversion executing subprogram 1152 will be described with reference to FIG. 14.

The differential snapshot format conversion control subprogram 1153 receives a request from the NAS management terminal 102 to execute differential snapshot format conversion processing. Upon reception of the request, the differential snapshot format conversion control subprogram 1153 activates the differential snapshot format conversion executing subprogram 1154. The differential snapshot format conversion processing is processing to convert a differential snapshot into a full-copy snapshot. Details of processing performed by the differential snapshot format conversion control subprogram 1153 will be described with reference to FIG. 15.

The differential snapshot format conversion executing subprogram 1154 executes the differential snapshot format conversion processing. Details of processing performed by the differential snapshot format conversion executing subprogram 1154 will be described with reference to FIG. 16.

The volume-to-be-read-during-conversion selecting subprogram 1155 is activated by the read processing subprogram 1132 when the read processing subprogram 1132 receives a read request while at least one of the full-copy snapshot format conversion executing subprogram 1152 and the differential snapshot format conversion executing subprogram 1154 is executed. The volume-to-be-read-during-conversion selecting subprogram 1155 chooses a logical volume out of which the read processing subprogram 1132 actually reads data.

Figure 10:
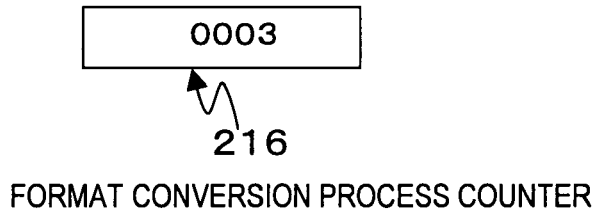
FIG. 10 is an explanatory diagram of a format conversion process counter in the NAS server subsystem according to the embodiment of this invention.

FIG. 10 is an explanatory diagram of the format conversion process counter 216 in the NAS server subsystem 110 according to the embodiment of this invention.

The format conversion process counter 216 counts how many snapshot format conversion executing subprograms are being executed. The term "snapshot format conversion executing subprograms" collectively refers to the full-copy snapshot format conversion executing subprogram 1152 and the differential snapshot format conversion executing subprogram 1154. The format conversion process counter 216 in the explanatory diagram of FIG. 10 shows that three snapshot format conversion executing subprograms are operating simultaneously.

The format conversion process counter 216 is incremented at the start of execution of the snapshot format conversion executing subprograms. When the execution of the snapshot format conversion executing subprograms is ended, the format conversion process counter 216 is decremented.

The read processing subprogram 1132 consults the format conversion process counter 216 to judge whether to activate the volume-to-be-read-during-conversion selecting subprogram 1155.

Figure 11:
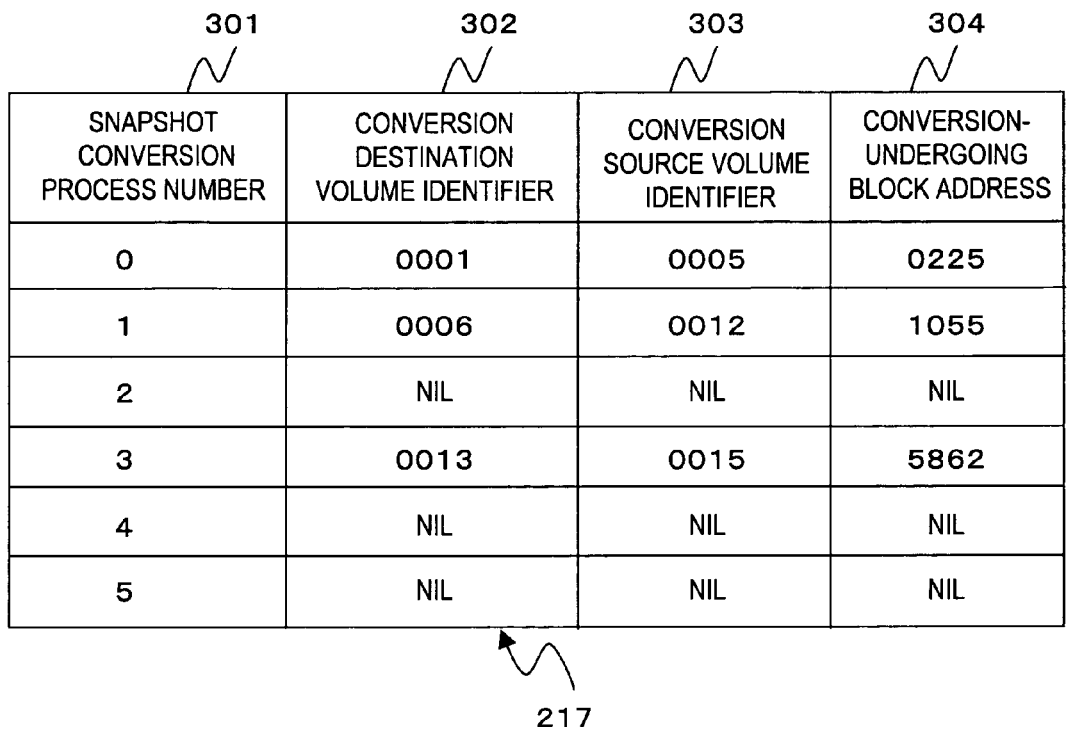
FIG. 11 is a configuration diagram of a snapshot format conversion management table in the NAS server subsystem according to the embodiment of this invention.

FIG. 11 is a configuration diagram of the snapshot format conversion management table 217 in the NAS server subsystem 110 according to the embodiment of this invention.

The snapshot format conversion management table 217 is used to manage full-copy snapshot format conversion processing, which is executed by the full-copy snapshot format conversion executing subprogram 1152, and differential snapshot format conversion processing, which is executed by the differential snapshot format conversion executing subprogram 1154. The snapshot format conversion management table 217 therefore contains a snapshot conversion process number 301, a conversion destination volume identifier 302, a conversion source volume identifier 303, and an undergoing-conversion block address 304.

The snapshot conversion process number 301 indicates an identifier unique to each of the snapshot format conversion executing subprograms. In the explanatory diagram of FIG. 11, "0", "1", and "2" entered in a column of the snapshot conversion process number 301 are identifiers given to the full-copy snapshot format conversion executing subprogram 1152, while "3", "4", and "5" entered in the column of the snapshot conversion process number 301 are identifiers given to the differential snapshot format conversion executing subprogram 1154.

The conversion destination volume identifier 302 indicates an identifier unique to a snapshot volume that is a format conversion destination. Specifically, in a record entry for the full-copy snapshot format conversion executing subprogram 1152, the identifier of the full-copy snapshot volume 151 that is a format conversion destination is stored as the conversion destination volume identifier 302. In a record entry for the differential snapshot format conversion executing subprogram 1154, on the other hand, the identifier of the differential snapshot virtual volume 152 that is a format conversion destination is stored as the conversion destination volume identifier 302.

The conversion source volume identifier 303 indicates an identifier unique to a snapshot volume that is a format conversion source. Specifically, in a record entry for the full-copy snapshot format conversion executing subprogram 1152, the identifier of the differential snapshot virtual volume 152 that is a format conversion source is stored as the conversion source volume identifier 303. In a record entry for the differential snapshot format conversion executing subprogram 1154, on the other hand, the identifier of the full-copy snapshot volume 151 that is a format conversion source is stored as the conversion source volume identifier 303.

The undergoing-conversion block address 304 indicates an identifier unique to a block whose data is undergoing format conversion by one of the snapshot format conversion executing subprograms.

Figure 12:
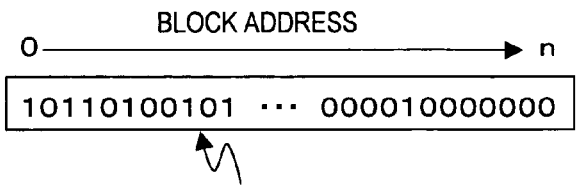
FIG. 12 is an explanatory diagram of a differential block copy bitmap of the NAS server subsystem according to the embodiment of this invention.

FIG. 12 is an explanatory diagram of the differential block copy bitmap 218 of the NAS server subsystem 110 according to the embodiment of this invention.

The differential block copy bitmap 218 is a copy of the differential block bitmap 122 of the storage subsystem 120 which is shown in FIG. 8. Accordingly, the differential block copy bitmap 218 indicates the address of a block where data stored in the primary volume 141 differs from data stored in the full-copy snapshot volume 151. The differential block copy bitmap 218 therefore has a bit width equal to or larger than the count of blocks constituting the primary volume 141.

In the differential block copy bitmap 218 of this embodiment, "1" is given as the bit value of a block where data stored in the primary volume 141 differs from data stored in the differential volume 142, while "0" is given as the bit value of a block where the primary volume 141 and the full-copy snapshot volume 151 store the same data.

Figure 13:
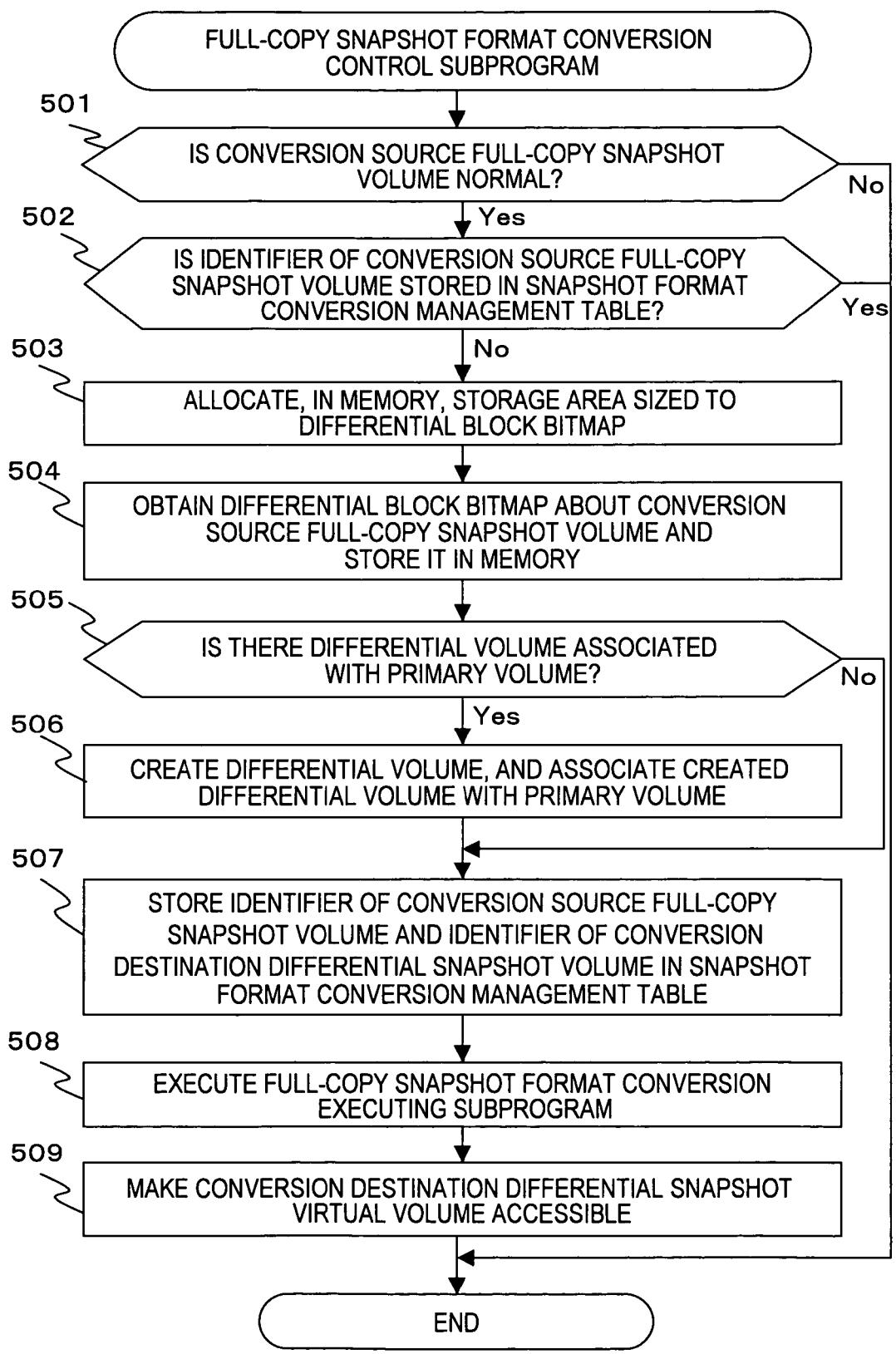
FIG. 13 is a flow chart for processing of a full-copy snapshot format conversion control subprogram according to the embodiment of this invention.

FIG. 13 is a flow chart for processing of the full-copy snapshot format conversion control subprogram 1151 according to the embodiment of this invention.

The full-copy snapshot format conversion control subprogram 1151 receives a request from the NAS management terminal 102 to execute full-copy snapshot format conversion processing and starts this processing. The full-copy snapshot format conversion control subprogram 1151 first judges whether the full-copy snapshot volume 151 that is the target of format conversion (conversion source) is normal or not (501). For instance, the full-copy snapshot format conversion control subprogram 1151 checks a logical volume state flag which shows whether a logical volume is normal or not to judge whether or not the full-copy snapshot volume 151 is normal. The logical volume state flag is stored in the memory 12 of the NAS server subsystem 110.

In the case where the full-copy snapshot volume 151 that is the conversion source is not normal, the full-copy snapshot format conversion control subprogram 1151 judges that full-copy snapshot format conversion processing is inexecutable, and terminates this processing.

In the case where the full-copy snapshot volume 151 that is the conversion source is normal, the full-copy snapshot format conversion control subprogram 1151 judges whether or not the identifier of the full-copy snapshot volume 151 that is the conversion source is stored in the snapshot format conversion management table 217 as at least one of the conversion destination volume identifier 302 and the conversion source volume identifier 303 (502).

In the case where the identifier of the full-copy snapshot volume 151 that is the conversion source is stored in the snapshot format conversion management table 217, the full-copy snapshot format conversion control subprogram 1151 judges that this full-copy snapshot volume 151 is receiving snapshot format conversion processing. Then, the full-copy snapshot format conversion control subprogram 1151 terminates this processing.

On the other hand, in the case where the identifier of the full-copy snapshot volume 151 that is the conversion source is not stored in the snapshot format conversion management table 217, the full-copy snapshot format conversion control subprogram 1151 judges that full-copy snapshot format conversion processing is executable for this full-copy snapshot volume 151.

Then, the full-copy snapshot format conversion control subprogram 1151 allocates a storage area sized to the differential block bitmap 122 of the storage subsystem 120 in the memory 12 of the NAS server subsystem 110 (503).

The full-copy snapshot format conversion control subprogram 1151 next obtains, from the storage subsystem 120, the differential block bitmap 122 related to the full-copy snapshot volume 151 that is the conversion source. The obtained differential block bitmap 122 is stored by the full-copy snapshot format conversion control subprogram 1151 in the storage area that has been allocated in the memory 12 in Step 503 (504). The full-copy snapshot format conversion control subprogram 1151 thus stores the differential block copy bitmap 218, which is a copy of the differential block bitmap 122, in the memory 12 of the NAS server subsystem 110.

The full-copy snapshot format conversion control subprogram 1151 next identifies the primary volume 141 a copy of which is the conversion source full-copy snapshot volume 151. The full-copy snapshot format conversion control subprogram 1151 judges whether or not there is the differential volume 142 that is associated with the identified primary volume 141 (505). Each primary volume 141 is associated with one differential volume 142 that stores differential data of that primary volume 141.

In the case where there is the differential volume 142 that is associated with the identified primary volume 141, the full-copy snapshot format conversion control subprogram 1151 proceeds to Step 507.

In the case where there is no differential volume 142 that is associated with the identified primary volume 141, the full-copy snapshot format conversion control subprogram 1151 creates a new differential volume 142. The full-copy snapshot format conversion control subprogram 1151 associates the created differential volume 142 with the primary volume 141 that has been identified in Step 505 (506).

The full-copy snapshot format conversion control subprogram 1151 next determines the identifier of the differential snapshot virtual volume 152 that is the conversion destination.

Then the full-copy snapshot format conversion control subprogram 1151 updates the snapshot format conversion management table 217.

Specifically, the full-copy snapshot format conversion control subprogram 1151 selects which full-copy snapshot format conversion executing subprogram 1152 is to execute full-copy snapshot format conversion processing. For instance, the full-copy snapshot format conversion control subprogram 1151 chooses the full-copy snapshot format conversion executing subprogram 1152 that is not currently executing full-copy snapshot format conversion processing.

The full-copy snapshot format conversion control subprogram 1151 next chooses, from the snapshot format conversion management table 217, a record entry whose snapshot conversion process number 301 matches the identifier of the chosen full-copy snapshot format conversion executing subprogram 1152.

The full-copy snapshot format conversion control subprogram 1151 enters the identifier of the differential snapshot virtual volume 152 that is the conversion destination as the conversion destination volume identifier 302 in the chosen record entry. Then the full-copy snapshot format conversion control subprogram 1151 enters the identifier of the conversion source full-copy snapshot volume 151 as the conversion source volume identifier 303 in the chosen record entry (507).

The full-copy snapshot format conversion control subprogram 1151 now requests the full-copy snapshot format conversion executing subprogram 1152 to execute full-copy snapshot format conversion processing (508).

After that, the full-copy snapshot format conversion control subprogram 1151 makes the differential snapshot virtual volume 152 that is the conversion destination accessible to the NAS client 101 and the NAS management terminal 102 (509). The full-copy snapshot format conversion control subprogram 1151 then ends this processing.

Figure 14:
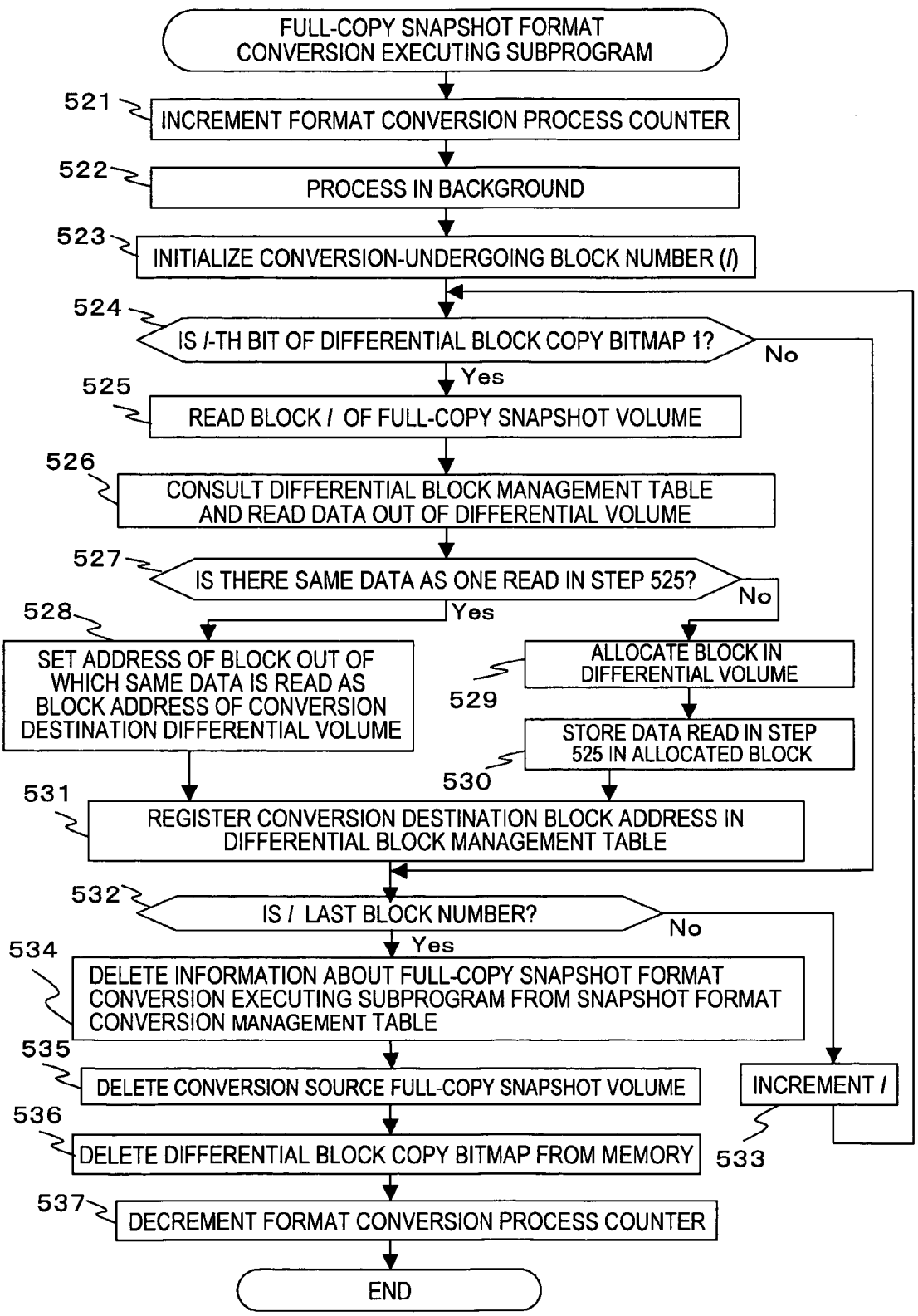
FIG. 14 is a flow chart for processing of a full-copy snapshot format conversion executing subprogram according to the embodiment of this invention.

FIG. 14 is a flow chart for processing of the full-copy snapshot format conversion executing subprogram 1152 according to the embodiment of this invention.

The full-copy snapshot format conversion executing subprogram 1152 receives a request from the full-copy snapshot format conversion control subprogram 1151 to execute full-copy snapshot format conversion processing, and starts this processing.

The full-copy snapshot format conversion executing subprogram 1152 first increments the format conversion process counter 216 (521). When the value of the format conversion process counter 216 is 1 or larger, it means that at least one of the full-copy snapshot format conversion executing subprogram 1152 and the differential snapshot format conversion executing subprogram 1154 is being executed.

The full-copy snapshot format conversion executing subprogram 1152 next processes subsequent processing in the background (522). In other words, the NAS management terminal 102 receives a notification of completion of the full-copy snapshot format conversion processing immediately after sending a request to execute full-copy snapshot format conversion processing to the NAS integrated system 104.

Next, the full-copy snapshot format conversion executing subprogram 1152 enters "0", which is a default value, as the undergoing-conversion block address (/) 304 in the snapshot format conversion management table 217 (523).

The full-copy snapshot format conversion executing subprogram 1152 chooses, from the differential block management table 203, one of record entries where "0" is stored as the use flag 2037. Then the full-copy snapshot format conversion executing subprogram 1152 creates a snapshot generation of the VVOL number 2031 of the chosen record entry.

Specifically, the full-copy snapshot format conversion executing subprogram 1152 extracts the /-th bit of the differential block copy bitmap 218. The full-copy snapshot format conversion executing subprogram 1152 judges whether the extracted /-th bit is "1" or not (524).

In the case where the /-th bit is "0", data in a block I of the full-copy snapshot volume 151 matches data in a block I of the primary volume 141. "Block /" refers to a block that has a block address "/". The block / has now been processed and the full-copy snapshot format conversion executing subprogram 1152 proceeds to Step 532.

On the other hand, in the case where the /-th bit is "1", data in a block / of the full-copy snapshot volume 151 differs from data in a block / of the primary volume 141. The full-copy snapshot format conversion executing subprogram 1152 therefore needs to store data in the block / of the full-copy snapshot volume 151 in the differential volume 142.

To fulfill this, the full-copy snapshot format conversion executing subprogram 1152 reads data out of the block / of the full-copy snapshot volume 151.

The full-copy snapshot format conversion executing subprogram 1152 then chooses, from the differential block management table 203, a record entry whose block address 2032 matches the block address of this block being processed, "/" (525).

From the chosen record entry, the full-copy snapshot format conversion executing subprogram 1152 picks up every data state 2033 that is about a valid snapshot generation. Specifically, the full-copy snapshot format conversion executing subprogram 1152 judges whether the data state 2033 in question is about a valid snapshot generation or not based on the use flag 2037 of the differential block management table 203.

The full-copy snapshot format conversion executing subprogram 1152 extracts all other values (block addresses) than "0" from the picked up data state 2033. The full-copy snapshot format conversion executing subprogram 1152 reads out of the differential volume 142 data of blocks at the extracted block addresses (526).

The full-copy snapshot format conversion executing subprogram 1152 judges whether or not the same data as the one read in Step 525 is included in the data read in Step 526 (527). The full-copy snapshot format conversion executing subprogram 1152 thus judges whether data in the block / of the full-copy snapshot volume 151 has been stored in the differential volume 142 or not.

In the case where the same data is included, it means that data in the block / of the full-copy snapshot volume 151 has been stored in the differential volume 142. Then, there is no need for the full-copy snapshot format conversion executing subprogram 1152 to store, in the differential volume 142, data in the block / of the full-copy snapshot volume 151.

The full-copy snapshot format conversion executing subprogram 1152 therefore sets the block address of a block out of which the same data has been read in Step 526 as a conversion destination block address (528). Subsequently, the full-copy snapshot format conversion executing subprogram 1152 moves to Step 531.

In the case where it is found in Step 527 that the same data is not included, it means that data in the block *l* of the full-copy snapshot volume 151 has not been stored in the differential volume 142. The full-copy snapshot format conversion executing subprogram 1152 therefore needs to store, in the differential volume 142, data in the block *l* of the full-copy snapshot volume 151. To fulfill this, the full-copy snapshot format conversion executing subprogram 1152 allocates a block in the differential volume 142 (529).

The full-copy snapshot format conversion executing subprogram 1152 stores the data read in Step 525 in the allocated block (530). The full-copy snapshot format conversion executing subprogram 1152 sets the block address of this block storing the read data as a conversion destination block address.

Next, the full-copy snapshot format conversion executing subprogram 1152 picks up, from the record entry chosen in Step 525, the data state 2033 where the generation of a snapshot to be created matches the VVOL number 2031 of the differential block management table 203.

The full-copy snapshot format conversion executing subprogram 1152 enters the conversion destination block address as the picked up data state 2033 (531).

The full-copy snapshot format conversion executing subprogram 1152 next judges whether or not the block *l* is the last block in the full-copy snapshot volume 151 that is the conversion source (532).

When the block *l* is not the last block, it means that there are blocks in the full-copy snapshot volume 151 that have not finished being processed. The full-copy snapshot format conversion executing subprogram 1152 therefore increments *l* by one (533). Then the full-copy snapshot format conversion executing subprogram 1152 returns to Step 524 to repeat processing of a block *l*.

When the block *l* is the last block, on the other hand, it means that the full-copy snapshot format conversion executing subprogram 1152 has finished processing for every block in the full-copy snapshot volume 151. In this case, the full-copy snapshot format conversion executing subprogram 1152 chooses from the snapshot format conversion management table 217 a record entry whose snapshot conversion process number 301 matches the identifier of this full-copy snapshot format conversion executing subprogram 1152. From the chosen record entry, the full-copy snapshot format conversion executing subprogram 1152 deletes information corresponding to the conversion destination volume identifier 302, the conversion source volume identifier 303, and the conversion-undergoing block address 304.

The full-copy snapshot format conversion executing subprogram 1152 thus deletes information related to itself from the snapshot format conversion management table 217 (534).

The full-copy snapshot format conversion executing subprogram 1152 next deletes the full-copy snapshot volume 151 that is the conversion source (535). Instead of immediately deleting the full-copy snapshot volume 151 that is the conversion source, the full-copy snapshot format conversion executing subprogram 1152 may delete the full-copy snapshot volume 151 when the storage subsystem 120 becomes short of storage area.

Next, the full-copy snapshot format conversion executing subprogram 1152 deletes the differential block copy bitmap 218 from the memory 12 (536). The full-copy snapshot format conversion executing subprogram 1152 then decrements the format conversion process counter 216 (537), and ends this processing.

Figure 15:
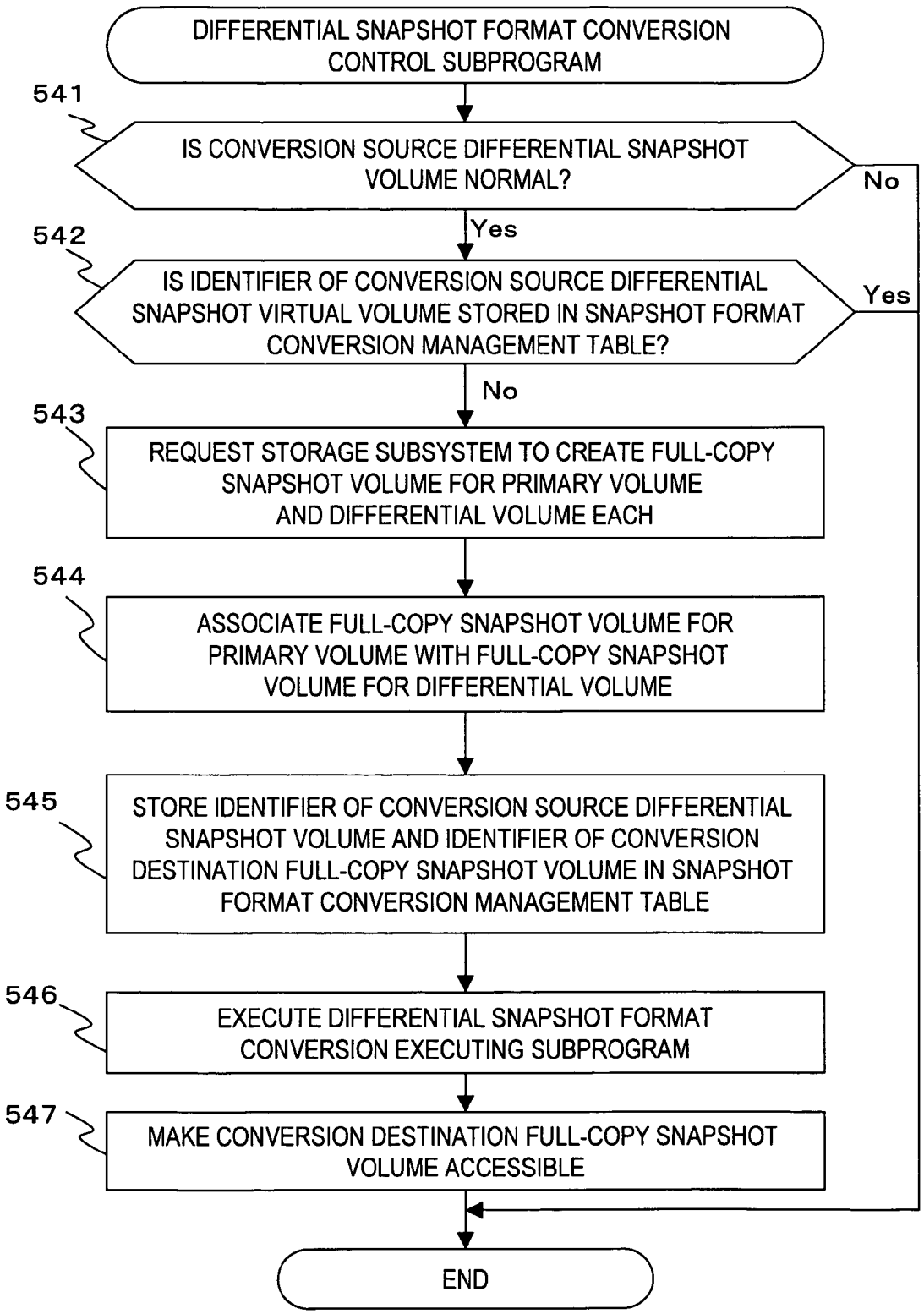
FIG. 15 is a flow chart for processing of a differential snapshot format conversion control subprogram according to the embodiment of this invention.

FIG. 15 is a flow chart for processing of the differential snapshot format conversion control subprogram 1153 according to the embodiment of this invention.

The differential snapshot format conversion control subprogram 1153 receives a request from the NAS management terminal 102 to execute differential snapshot format conversion processing and starts this processing. The differential snapshot format conversion control subprogram 1153 first judges whether the differential snapshot virtual volume 152 that is the target of format conversion (conversion source) is normal or not (541).

In the case where the differential snapshot virtual volume 152 that is the conversion source is not normal, the differential snapshot format conversion control subprogram 1153 judges that differential snapshot format conversion processing is inexecutable, and terminates this processing.

In the case where the differential snapshot virtual volume 152 that is the conversion source is normal, the differential snapshot format conversion control subprogram 1153 judges whether or not the identifier of the differential snapshot virtual volume 152 that is the conversion source is stored in the snapshot format conversion management table 217 as at least one of the conversion destination volume identifier 302 and the conversion source volume identifier 303 (542).

In the case where the identifier of the differential snapshot virtual volume 152 that is the conversion source has been stored, it means that this differential snapshot virtual volume 152 is receiving snapshot format conversion processing. Therefore, the differential snapshot format conversion control subprogram 1153 terminates this processing.

In the case where the identifier of the differential snapshot virtual volume 152 that is the conversion source has not been stored, on the other hand, the differential snapshot format conversion control subprogram 1153 requests the storage subsystem 120 to create a full-copy snapshot of the primary volume 141 and a full-copy snapshot of the differential volume 142 (543).

Upon request, the storage subsystem 120 creates the full-copy snapshot volume 151 for the primary volume 141 and the full-copy snapshot volume 151 for the differential volume 142. Those full-copy snapshot volumes 151 are set to be inaccessible to the NAS client 101 and the NAS management terminal 102.

The differential snapshot format conversion control subprogram 1153 associates the full-copy snapshot volume 151 for the primary volume 141 with the full-copy snapshot volume 151 for the differential volume 142 (544). The full-copy snapshot volume 151 for the primary volume 141 corresponds to a conversion destination snapshot.

Next, the differential snapshot format conversion control subprogram 1153 updates the snapshot format conversion management table 217.

Specifically, the differential snapshot format conversion control subprogram 1153 selects which differential snapshot format conversion executing subprogram 1154 is to execute differential snapshot format conversion processing. For instance, the differential snapshot format conversion control subprogram 1153 chooses the differential snapshot format conversion executing subprogram 1154 that is not currently executing differential snapshot format conversion processing.

The differential snapshot format conversion control subprogram 1153 next chooses, from the snapshot format conversion management table 217, a record entry whose snapshot conversion process number 301 matches the identifier of the chosen differential snapshot format conversion executing subprogram 1154.

The differential snapshot format conversion control subprogram 1153 enters the identifier of the full-copy snapshot volume 151 for the primary volume 141 as the conversion destination volume identifier 302 in the chosen record entry. Then the differential snapshot format conversion control subprogram 1153 enters the identifier of the differential snapshot virtual volume 152 that is the conversion source as the conversion source volume identifier 303 in the chosen record entry (545).

The differential snapshot format conversion control subprogram 1153 now requests the differential snapshot format conversion executing subprogram 1154 to execute differential snapshot format conversion processing (546).

After that, the differential snapshot format conversion control subprogram 1153 makes the full-copy snapshot volume 151 that is the conversion destination accessible to the NAS client 101 and the NAS management terminal 102 (547). The differential snapshot format conversion control subprogram 1153 then ends this processing.

Figure 16:
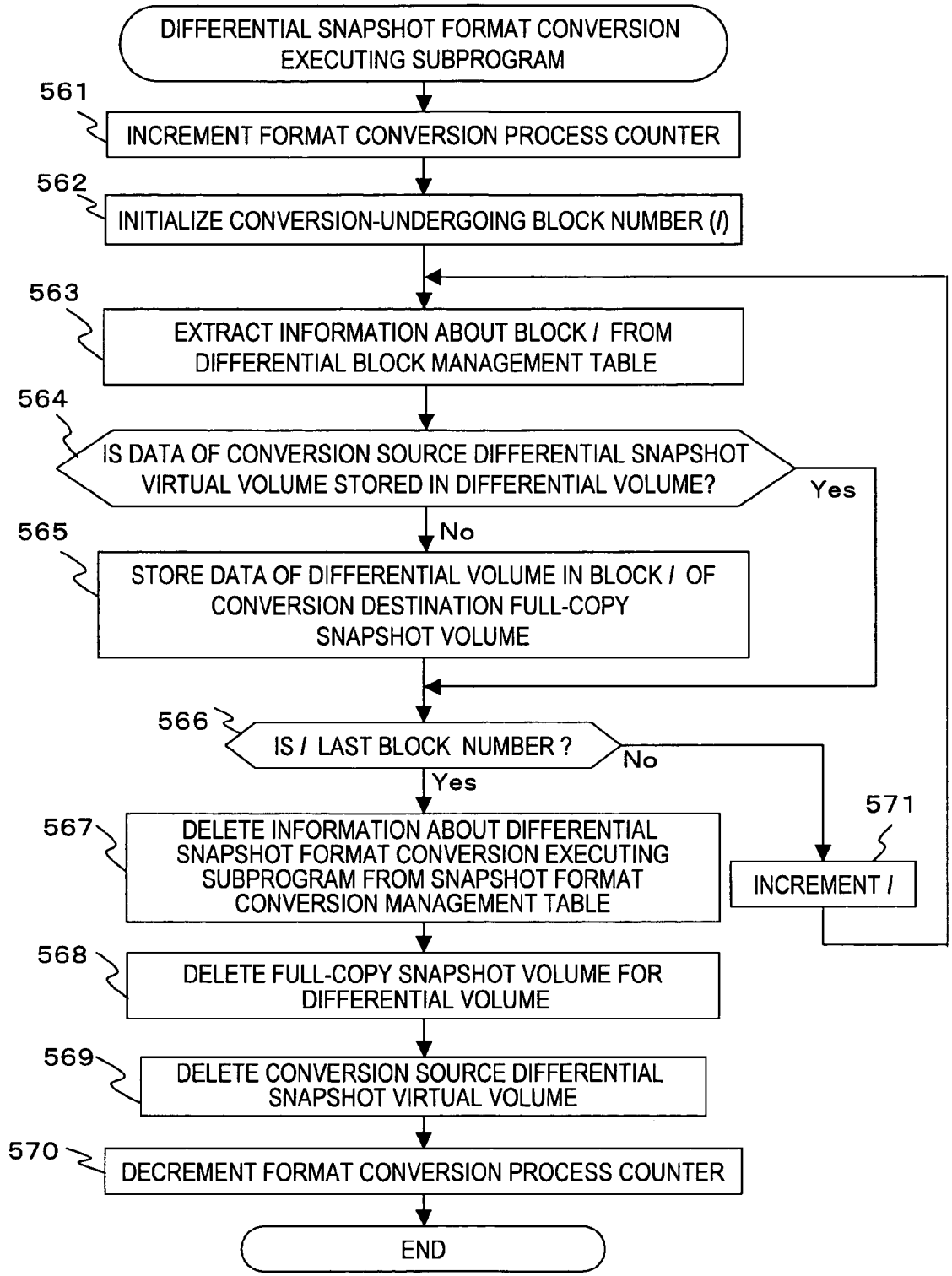
FIG. 16 is a flow chart for processing of a differential snapshot format conversion executing subprogram according to the embodiment of this invention.

FIG. 16 is a flow chart for processing of the differential snapshot format conversion executing subprogram 1154 according to the embodiment of this invention.

The differential snapshot format conversion executing subprogram 1154 receives a request from the differential snapshot format conversion control subprogram 1153 to execute differential snapshot format conversion processing, and starts this processing.

The differential snapshot format conversion executing subprogram 1154 first increments the format conversion process counter 216 (561). When the value of the format conversion process counter 216 is 1 or larger, it means that at least one of the full-copy snapshot format conversion executing subprogram 1152 and the differential snapshot format conversion executing subprogram 1154 is being executed.

The differential snapshot format conversion executing subprogram 1154 next processes subsequent processing in the background (562). In other words, the NAS management terminal 102 receives a notification of completion of the differential snapshot format conversion processing immediately after sending a request to execute differential snapshot format conversion processing to the NAS integrated system 104.

Next, the differential snapshot format conversion executing subprogram 1154 enters "0", which is a default value, as the undergoing-conversion block address (/) 304 in the snapshot format conversion management table 217 (563).

The differential snapshot format conversion executing subprogram 1154 chooses, from the differential block management table 203, a record entry whose VVOL number 2031 matches the snapshot generation of the differential snapshot virtual volume 152 that is the conversion source. From the chosen record entry, the differential snapshot format conversion executing subprogram 1154 picks up the data state 2033 where the block address of a block that is being processed, "/", matches the block address 2032 of the differential block management table 203.

The differential snapshot format conversion executing subprogram 1154 judges whether the picked up data state 2033 is "0" or not. The differential snapshot format conversion executing subprogram 1154 thus judges whether or not data in the block / of the differential snapshot virtual volume 152 that is the conversion source has been stored in the full-copy snapshot volume 151 for the differential volume 142 (564).

In the case where data in the block / of the differential snapshot virtual volume 152 has not been stored, it means that data in a block / of the full-copy snapshot volume 151 that is the conversion destination is the same as data in the block / of the differential snapshot virtual volume 152 that is the conversion source. Therefore, the differential snapshot format conversion executing subprogram 1154 immediately proceeds to Step 566.

On the other hand, in the case where data in the block / of the differential snapshot virtual volume 152 has been stored in the differential volume 142, it means that data in the block / of the full-copy snapshot volume 151 that is the conversion destination differs from data in the block / of the differential snapshot virtual volume 152 that is the conversion source.

Then, the differential snapshot format conversion executing subprogram 1154 extracts a block address that is stored in the picked up data state 2033 in Step 564. From the full-copy snapshot volume 151 for the differential volume 142, the differential snapshot format conversion executing subprogram 1154 extracts data in a block that has the extracted block address. The differential snapshot format conversion executing subprogram 1154 stores the extracted data in the block / of the full-copy snapshot volume 151 that is the conversion destination (565).

The differential snapshot format conversion executing subprogram 1154 next judges whether or not the block / is the last block in the differential snapshot virtual volume 152 that is the conversion source (566).

When the block / is not the last block, it means that there are blocks in the differential snapshot virtual volume 152 that have not finished being processed. The differential snapshot format conversion executing subprogram 1154 therefore increments / by one (571). Then the differential snapshot format conversion executing subprogram 1154 returns to Step 563 to repeat processing of a block /.

When the block / is the last block, on the other hand, it means that the differential snapshot format conversion executing subprogram 1154 has finished processing for every block in the differential snapshot virtual volume 152.

In this case, the differential snapshot format conversion executing subprogram 1154 chooses, from the snapshot format conversion management table 217, a record entry whose snapshot conversion process number 301 matches the identifier of this differential snapshot format conversion executing subprogram 1154. From the chosen record entry, the differential snapshot format conversion executing subprogram 1154 deletes information corresponding to the conversion destination volume identifier 302, the conversion source volume identifier 303, and the conversion-undergoing block address 304.

The differential snapshot format conversion executing subprogram 1154 thus deletes information related to itself from the snapshot format conversion management table 217 (567).

The differential snapshot format conversion executing subprogram 1154 next deletes the full-copy snapshot volume 151 for the differential volume 142 (568).

Next, the differential snapshot format conversion executing subprogram 1154 deletes the differential snapshot virtual volume 152 that is the conversion source (569). Specifically, the differential snapshot format conversion executing subprogram 1154 chooses, from the differential block management table 203, a record entry whose VVOL number 2031 matches the snapshot generation of the differential snapshot virtual volume 152 that is to be deleted. Then the differential snapshot format conversion executing subprogram 1154 enters "0", which means "invalid", as the use flag 2037 in the chosen record entry.

Instead of immediately deleting the differential snapshot virtual volume 152 that is the conversion source, the differential snapshot format conversion executing subprogram 1154 may delete the differential snapshot virtual volume 152 when the storage subsystem 120 becomes short of storage area.

The differential snapshot format conversion executing subprogram 1154 then decrements the format conversion process counter 216 (570), and ends this processing.

Figure 17:
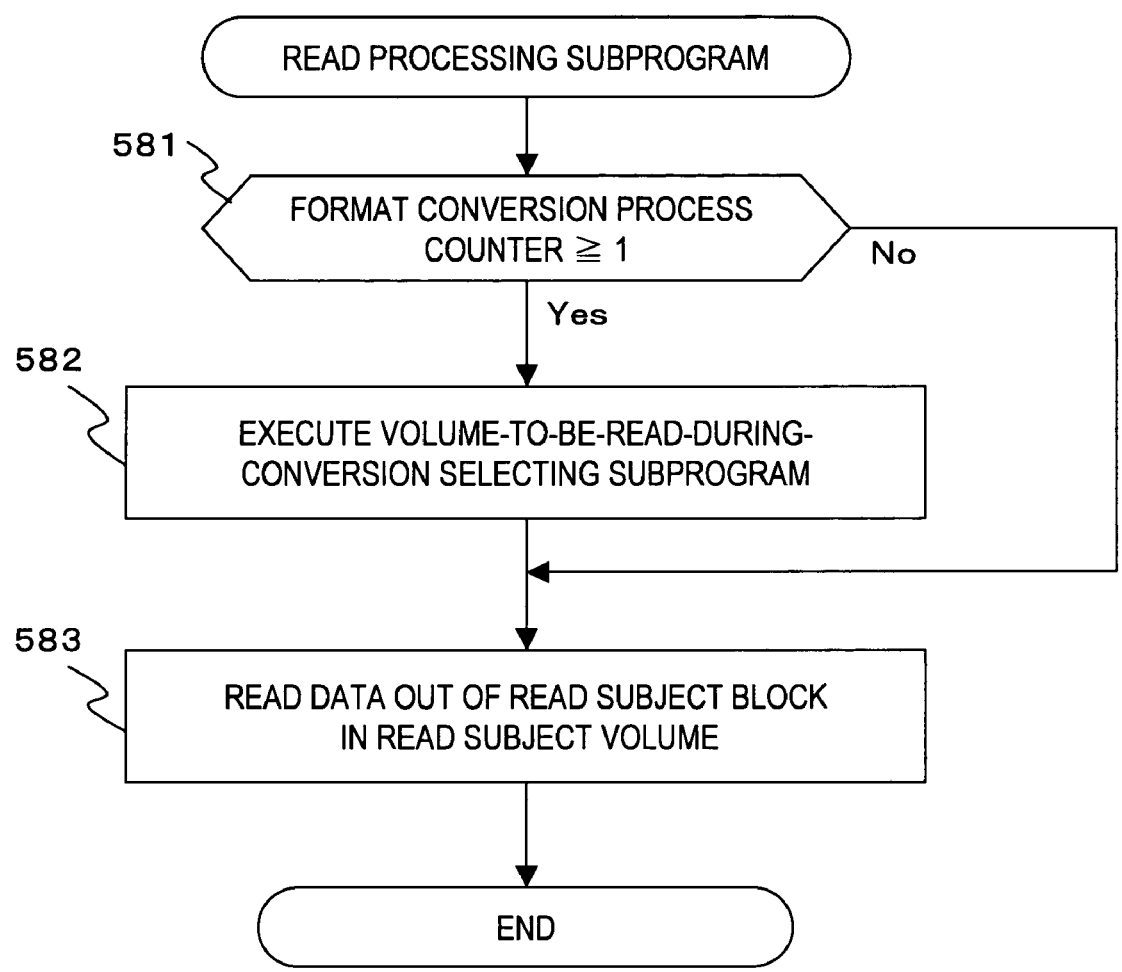
FIG. 17 is a flow chart for processing of a read processing subprogram according to the embodiment of this invention.

FIG. 17 is a flow chart for processing of the read processing subprogram 1132 according to the embodiment of this invention.

The read processing subprogram 1132 receives a read request from the file system processing program 112. Upon reception of the request, the read processing subprogram 1132 judges whether or not the format conversion process counter 216 shown in FIG. 10 is "1" or larger (581).

In the case where the format conversion process counter 216 is smaller than "1", it means that snapshot format conversion processing is not currently being executed. The read processing subprogram 1132 therefore performs normal read processing.

Specifically, the read processing subprogram 1132 identifies, based on the received read request, a logical volume out of which requested data is to be read (read subject volume) and a block out of which requested data is to be read (read subject block). The read processing subprogram 1132 next reads the data out of the read subject block in the read subject volume (583). The read processing subprogram 1132 sends the read data to the file system processing program 112.

In the case where the format conversion process counter 216 is "1" or larger, it means that snapshot format conversion processing is currently being executed. The read processing subprogram 1132 therefore requests execution of the volume-to-be-read-during-conversion selecting subprogram 1155 (582).

The read processing subprogram 1132 then performs read processing. Specifically, the read processing subprogram 1132 reads data out of a read subject block in a read subject volume (583). The read processing subprogram 1132 sends the read data to the file system processing program 112, and then ends this processing.

FIG. 18 is a flow chart for processing of the volume-to-be-read-during-conversion selecting subprogram 1155 according to the embodiment of this invention.

The volume-to-be-read-during-conversion selecting subprogram 1155 identifies, from a read request received by the read processing subprogram 1132, a logical volume that has data requested to be read (read subject volume). The volume-to-be-read-during-conversion selecting subprogram 1155 next judges whether or not the identifier of the identified read subject volume has been stored as the conversion destination volume identifier 302 in the snapshot format conversion management table 217 (591).

In the case where the identifier of the identified read subject volume has not been stored as the conversion destination volume identifier 302 in the snapshot format conversion management table 217, it means that the read subject volume is not in the middle of snapshot format conversion processing. The volume-to-be-read-during-conversion selecting subprogram 1155 therefore does not need to switch the read subject volume, and terminates this processing.

On the other hand, in the case where the identifier of the identified read subject volume has been stored as the conversion destination volume identifier 302 in the snapshot format conversion management table 217, the volume-to-be-read-during-conversion selecting subprogram 1155 chooses, from the snapshot format conversion management table 217, a record entry whose conversion destination volume identifier 302 matches the identifier of the identified read subject volume.

From the record entry chosen, the volume-to-be-read-during-conversion selecting subprogram 1155 extracts the conversion source volume identifier 303. The volume-to-be-read-during-conversion selecting subprogram 1155 sets a logical volume that is indicated by the extracted conversion source volume identifier 303 as a new read subject volume (592), and then ends this processing.

In the manner described above, the volume-to-be-read-during-conversion selecting subprogram 1155 prevents reading of arbitrary data out of a conversion destination (the full-copy snapshot volume 151 or the differential snapshot virtual volume 152) during snapshot format conversion processing.

The full-copy snapshot volume 151 and the differential snapshot virtual volume 152 in this embodiment accept only read access during snapshot format conversion processing. Accordingly, there is no need for a subprogram for write processing during snapshot format conversion processing.

The NAS integrated system 104 of this embodiment is capable of format conversion between full-copy snapshot and differential snapshot. The NAS integrated system 104 is also capable of converting a snapshot format without interrupting normal operation.

This enables the NAS integrated system 104 to convert, when there is a change in requirement for snapshot with time, a snapshot format into one that is suited to new requirements. The NAS integrated system 104 can thus reduce running cost.

While the present invention has been described in detail and pictorially in the accompanying drawings, the present invention is not limited to such detail but covers various obvious modifications and equivalent arrangements, which fall within the purview of the appended claims.

What is claimed is:

1. A system connected to a client computer via a network, comprising:
a storage subsystem; and
a server subsystem connected to the storage subsystem via a communication line,
wherein the storage subsystem comprises a disk drive for storing data, and a disk controller for controlling input and output of data to and from the disk drive,
wherein the server subsystem comprises an interface connected to the storage subsystem, a processor connected to the interface, and a memory connected to the processor,
wherein the disk controller provides storage areas of the disk drive as a plurality of logical volumes including a primary volume for storing data requested by the client computer to be written, a differential volume for storing differential data as a difference between the primary volume and a differential snapshot of the primary volume, and a full-copy snapshot volume for storing all data in the primary volume at the time a full-copy snapshot is taken,
wherein the disk controller stores a differential block bitmap indicating a block in which data stored in the primary volume differs from data stored in the full-copy snapshot volume, and
wherein the processor obtains the differential block bitmap from the disk controller, identifies, based on the obtained differential block bitmap, a block where data stored in the primary volume differs from data stored in the full-copy snapshot volume, obtains, from the full-copy snapshot volume, differential data that is stored in the identified block, stores the obtained differential data in the differential volume, stores, in differential block arrangement information, a location of the differential data that is stored in the differential volume, and provides a differential snapshot that corresponds to the full-copy snapshot based on the primary volume, the differential volume, and the differential block arrangement information.

2. The system according to claim 1,
wherein the processor judges, based on the differential block arrangement information, whether or not the obtained differential data is stored in the differential volume, and
wherein, when the obtained differential data is not stored in the differential volume, the processor stores the obtained differential data in the differential volume.

3. The system according to claim 1,
wherein the differential block bitmap comprises at least as many bits as the smaller one of block count of the primary volume and block count of the full-copy snapshot volume,
wherein bits contained in the differential block bitmap correspond to blocks in the primary volume and the full-copy snapshot volume,
wherein, when data stored in a block of the primary volume is the same as data stored in a block of the full-copy snapshot volume, the disk controller sets a default value to a bit contained in the differential block bitmap, and
wherein, when data stored in a block of the primary volume differs from data stored in a block of the full-copy snapshot volume, the disk controller sets a value different from a default value to a bit contained in the differential block bitmap.

4. The system according to claim 1, wherein the processor further identifies, based on the differential block arrangement information, a location of differential data that is the difference between the primary volume and the differential snapshot, extracts, from the differential volume, differential data that is stored in a block at the identified location, and provides a full-copy snapshot that corresponds to the differential snapshot by making the extracted differential data reflected on a copy of the primary volume.

5. The system according to claim 1,
wherein the memory stores snapshot format conversion management information indicating an association between the full-copy snapshot that is a format conversion source and the differential snapshot that is a format conversion destination,
wherein, receiving a request to read data of a snapshot, the processor judges based on the snapshot format conversion management information whether the snapshot out of which data is requested to be read is a format conversion destination or not, and
wherein, when the snapshot out of which data is requested to be read is a format conversion destination, the processor identifies a format conversion source snapshot that corresponds to the format conversion destination snapshot, and then reads data out of the identified format conversion source snapshot.

6. The system according to claim 4,
wherein the memory stores snapshot format conversion management information indicating an association between the differential snapshot that is a format conversion source and the full-copy snapshot that is a format conversion destination,
wherein, receiving a request to read data of a snapshot, the processor judges based on the snapshot format conversion management information whether the snapshot out of which data is requested to be read is a format conversion destination or not, and
wherein, when the snapshot out of which data is requested to be read is a format conversion destination, the processor identifies a format conversion source snapshot that corresponds to the format conversion destination snapshot, and then reads data out of the identified format conversion source snapshot.

7. A server subsystem connected to a storage subsystem and a client computer, comprising:
a first interface connected to the storage subsystem via a communication line;
a second interface connected to the client computer via a network;
a processor connected to the first interface and the second interface; and
a memory connected to the processor,
wherein the storage subsystem comprises a disk drive for storing data,
wherein the storage subsystem provides storage areas of the disk drive as a plurality of logical volumes including a primary volume for storing data requested by the client computer to be written, a differential volume for storing differential data as a difference between the primary volume and a differential snapshot of the primary volume, and a full-copy snapshot volume for storing all data in the primary volume at the time a full-copy snapshot is taken,
wherein the storage subsystem stores a differential block bitmap indicating a block in which data stored in the primary volume differs from data stored in the full-copy snapshot volume, and
wherein the processor obtains the differential block bitmap from the storage subsystem, identifies, based on the obtained differential block bitmap, a block where data stored in the primary volume differs from data stored in the full-copy snapshot volume, obtains, from the full-copy snapshot volume, differential data that is stored in the identified block, stores the obtained differential data in the differential volume, stores, in differential block arrangement information, a location of the differential data that is stored in the differential volume, and provides a differential snapshot that corresponds to the full-copy snapshot based on the primary volume, the differential volume, and the differential block arrangement information.

8. The server subsystem according to claim 7,
wherein the processor judges, based on the differential block arrangement information, whether or not the obtained differential data is stored in the differential volume, and
wherein, when the obtained differential data is not stored in the differential volume, the processor stores the obtained differential data in the differential volume.

9. The server subsystem according to claim 7, wherein the processor further identifies, based on the differential block arrangement information, a location of differential data that is the difference between the primary volume and the differential snapshot, extracts, from the differential volume, differential data that is stored in a block at the identified location, and provides a full-copy snapshot that corresponds to the differential snapshot by making the extracted differential data reflected on a copy of the primary volume.

10. The server subsystem according to claim 7,
wherein the memory stores snapshot format conversion management information indicating an association between the full-copy snapshot that is a format conversion source and the differential snapshot that is a format conversion destination,
wherein, receiving a request to read data of a snapshot, the processor judges based on the snapshot format conversion management information whether the snapshot out of which data is requested to be read is a format conversion destination or not, and
wherein, when the snapshot out of which data is requested to be read is a format conversion destination, the processor identifies a format conversion source snapshot that corresponds to the format conversion destination snapshot, and then reads data out of the identified format conversion source snapshot.

11. The server subsystem according to claim 9,
wherein the memory stores snapshot format conversion management information indicating an association between the differential snapshot that is a format conversion source and the full-copy snapshot that is a format conversion destination,
wherein, receiving a request to read data of a snapshot, the processor judges based on the snapshot format conversion management information whether the snapshot out of which data is requested to be read is a format conversion destination or not, and
wherein, when the snapshot out of which data is requested to be read is a format conversion destination, the processor identifies a format conversion source snapshot that corresponds to the format conversion destination snapshot, and then reads data out of the identified format conversion source snapshot.

12. A snapshot format conversion method for a system that comprises a storage subsystem and a server subsystem connected to the storage system via a communication line and that is connected to a client computer via a network, the storage subsystem comprising a disk drive for storing data, and a disk controller for controlling input and output of data to and from the disk drive, the storage subsystem providing storage areas of the disk drive as a plurality of logical volumes including a primary volume for storing data requested by the client computer to be written, a differential volume for storing differential data as a difference between the primary volume and a differential snapshot of the primary volume, and a full-copy snapshot volume for storing all data in the primary volume at the time a full-copy snapshot is taken, the server subsystem comprising an interface connected to the storage subsystem, a processor connected to the interface, and a memory connected to the processor, the snapshot conversion method comprising the steps of:
obtaining a differential block bitmap, the differential block bitmap indicating a block in which data stored in the primary volume differs from data stored in the full-copy snapshot volume;
identifying, based on the obtained differential block bitmap, a block where data stored in the primary volume differs from data stored in the full-copy snapshot volume;
obtaining, from the full-copy snapshot volume, differential data that is stored in the identified block;
storing the obtained differential data in the differential volume;
storing, in differential block arrangement information, a location of the differential data that is stored in the differential volume; and
providing a differential snapshot that corresponds to the full-copy snapshot based on the primary volume, the differential volume, and the differential block arrangement information.

13. The snapshot format conversion method according to claim 12, further comprising a step of judging based on the differential block arrangement information whether the obtained differential data is stored in the differential volume or not,
wherein, in the step of storing the obtained differential data in the differential volume, the obtained differential data is stored in the differential volume only when the obtained differential data is not stored in the differential volume.

14. The snapshot format conversion method according to claim 12,
wherein the differential block bitmap comprises at least as many bits as the smaller one of block count of the primary volume and block count of the full-copy snapshot volume,
wherein bits contained in the differential block bitmap correspond to blocks in the primary volume and the full-copy snapshot volume,
the snapshot format conversion method further comprising the steps of:
when data stored in a block of the primary volume is the same as data stored in a block of the full-copy snapshot volume, setting a default value to a bit contained in the differential block bitmap; and
when data stored in a block of the primary volume differs from data stored in a block of the full-copy snapshot volume, setting a value different from a default value to a bit contained in the differential block bitmap.

15. The snapshot format conversion method according to claim 12, further comprising the steps of:
identifying, based on the differential block arrangement information, a location of differential data that is the difference between the primary volume and the differential snapshot;
extracting, from the differential volume, differential data that is stored in a block at the identified location; and
providing a full-copy snapshot that corresponds to the differential snapshot by making the extracted differential data reflected on a copy of the primary volume.

16. The snapshot format conversion method according to claim 12, further comprising the steps of:
storing snapshot format conversion management information indicating an association between the full-copy snapshot that is a format conversion source and the differential snapshot that is a format conversion destination;
when receiving a request to read data of a snapshot, judging based on the snapshot format conversion management information whether the snapshot out of which data is requested to be read is a format conversion destination or not;
when the snapshot out of which data is requested to be read is a format conversion destination, identifying a format conversion source snapshot that corresponds to the format conversion destination snapshot; and
reading data out of the identified format conversion source snapshot.

17. The snapshot format conversion method according to claim 15, further comprising the steps of:
storing snapshot format conversion management information indicating an association between the differential snapshot that is a format conversion source and the full-copy snapshot that is a format conversion destination;

when receiving a request to read data of a snapshot, judging based on the snapshot format conversion management information whether the snapshot out of which data is requested to be read is a format conversion destination or not;

when the snapshot out of which data is requested to be read is a format conversion destination, identifying a format conversion source snapshot that corresponds to the format conversion destination snapshot; and reading data out of the identified format conversion source snapshot.

\* \* \* \* \*